(12) United States Patent
Matsukuma et al.

(10) Patent No.: US 7,075,294 B2
(45) Date of Patent: Jul. 11, 2006

(54) METHOD OF INSPECTING THIN-FILM MAGNETIC HEAD AND METHOD OF MAKING THIN-FILM MAGNETIC HEAD

(75) Inventors: Hiroki Matsukuma, Tokyo (JP); Muneyoshi Kobashi, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 87 days.

(21) Appl. No.: 10/919,408

(22) Filed: Aug. 17, 2004

(65) Prior Publication Data

US 2005/0073300 A1    Apr. 7, 2005

(30) Foreign Application Priority Data

Aug. 18, 2003 (JP) .......................... P2003-294522
Sep. 1, 2003  (JP) .......................... P2003-309106

(51) Int. Cl.
*G01R 33/12* (2006.01)
(52) U.S. Cl. ..................... 324/210; 324/212
(58) Field of Classification Search ............ 324/210, 324/212

See application file for complete search history.

(56) References Cited

FOREIGN PATENT DOCUMENTS

| JP | 63059795 A | * | 3/1988 |
|----|------------|---|--------|
| JP | A 06-150264 |   | 5/1994 |
| JP | 06203339 A | * | 7/1994 |
| JP | A 10-242544 |   | 9/1998 |
| JP | A 2000-260012 |   | 9/2000 |
| JP | 2002230728 A | * | 8/2002 |

* cited by examiner

*Primary Examiner*—Michael Tokar
(74) *Attorney, Agent, or Firm*—Oliff & Berridge, PLC

(57) ABSTRACT

In the method of inspecting a thin-film magnetic head, a thin-film magnetic head provided with a magnetoresistive film having a free layer whose magnetization direction changes depending on an external magnetic field and ferromagnetic layers for applying a bias magnetic field to the free layer is prepared. Then, a DC magnetic field is applied to the ferromagnetic layers in the bias magnetic field applying direction. Subsequently, an AC magnetic field is applied to the ferromagnetic layers in the bias magnetic field applying direction. Thereafter, an external magnetic field is applied to the magnetoresistive film while supplying a current thereto, and a property of the thin-film magnetic head such as asymmetry and reproducing output is inspected.

9 Claims, 43 Drawing Sheets

METHOD OF INSPECTING THIN-FILM MAGNETIC HEAD AND METHOD OF MAKING THIN-FILM MAGNETIC HEAD

RELATED APPLICATIONS

Japanese Patent Application No. 2003-294522 filed on Aug. 18, 2003 and Japanese Patent Application No. 2003-309106 filed on Sep. 1, 2003 are hereby incorporated herein by reference in their entirety.

BACKGROUND OF THE INVENTION

1. Field of the Invention

The present invention relates to a method of inspecting a thin-film magnetic head, and a method of making a thin-film magnetic head.

2. Related Background Art

In general, a thin-film magnetic head mounted in a hard disk drive or the like comprises a magnetoresistive film having a free layer whose magnetization direction changes depending on an external magnetic field and a pair of hard bias layers (ferromagnetic layers) for applying a bias magnetic field to the free layer and thereby achieving a single domain of magnetization direction (e.g., Japanese Patent Application Laid-Open No. HEI 10-242544). Under the influence of an external magnetic field from a hard disk (recording medium) or the like, the magnetization direction of the free layer changes, whereby information recorded on the hard disk or the like is reproduced according to the ohmic value corresponding to the magnetization direction.

In such a thin-film magnetic head, the write width for recording a signal and the read width for reproducing the same have been narrowing in a accelerated fashion as the recording density of the hard disk becomes higher. Therefore, the thin-film magnetic head produced by various thin-film processes is hard to make, whereby defective products with inferior properties may sometimes occur.

In general, properties of a thin-film magnetic head have been inspected in the following manner. First, a wafer formed with a plurality of thin-film magnetic heads is diced, so as to yield a bar in which heads are arranged in a row. Subsequently, the thin-film magnetic heads are lapped on their side facing the hard disk, so as to yield a desirable MR height. Then, the bar in such a state is set to an inspection apparatus. The inspection apparatus comprises a table for mounting the bar, a constant-current power supply which supplies a sense current to the magnetoresistive film in each thin-film magnetic head, a magnetic field generator such as Helmholtz coil which applies an external magnetic field to the thin-film magnetic head, etc.

After the inspection apparatus is prepared, the magnetic field generator is actuated, so as to apply an external magnetic field to the thin-film magnetic heads in the bar while the constant-current power supply supplies a sense current to the thin-film magnetic heads. In this environment, QST (Quasi Static Test) for inspecting properties such as a reproducing output of the thin-film magnetic head or an asymmetric property of output amplitude with respect to changes in the external magnetic field (so-called asymmetry) was carried out. Further, property values obtained by the inspection are compared with their reference values, so as to determine whether individual thin-film magnetic heads are favorable or not, whereby those failed are prohibited from shipping, etc. Examples of literatures disclosing such a method of inspecting a thin-film magnetic head include Japanese Patent Application Laid-open No. 2000-260012 and Japanese Patent Application Laid-Open No. HEI 6-150264.

SUMMARY OF THE INVENTION

However, the following problem exists in the conventional inspecting method. Namely, since thin-film magnetic heads are produced by way of a thin-film process which is hard to control, the magnetization direction may become unstable in their hard bias layers. Even if it is determined that such a thin-film magnetic head is a favorable product upon inspecting properties, the magnetic domain of its hard bias layer may change because of the sense current, external magnetic field, external temperature, etc. acting as a load when the thin-film magnetic head is actuated while being mounted to a hard disk drive in practice, thus failing to yield a desirable reproducing output, etc. A main factor by which the magnetization direction of a hard bias layer becomes unstable is lapping carried out for the bar in order to adjust the MR height. A processing distortion seems to occur in the thin-film magnetic head because of lapping, thereby making the magnetization direction unstable.

It is an object of the present invention to provide a method of inspecting a thin-film magnetic head which can inspect properties while in a state where the magnetization direction of a hard bias layer is made stable, and a method of making a thin-film magnetic head which can stabilize the magnetization direction of the hard bias layer.

(1) The method of inspecting a thin-film magnetic head in accordance with one aspect of the present invention comprises the steps of preparing a thin-film magnetic head comprising a magnetoresistive film having a free layer whose magnetization direction changes depending on an external magnetic field and a ferromagnetic layer for applying a bias magnetic field to the free layer; applying a DC magnetic field to the ferromagnetic layer in a direction along which the bias magnetic field is applied; thereafter applying an AC magnetic field to the ferromagnetic layer in a direction along which the bias magnetic field is applied; and inspecting a property of the thin-film magnetic head by applying an external magnetic field to the magnetoresistive film while supplying a current thereto.

These steps can inspect properties of a thin-film magnetic head in a state where the magnetization direction of a hard bias layer is stable. Though a mechanism by which the magnetization direction of the hard bias layer is stabilized, has not been elucidated, the inventors infer as follows. In general, there is a stable magnetization direction corresponding to the form of a magnetic domain. For example, the magnetization direction tends to become stable when the magnetization is oriented in the longitudinal direction of the magnetic domain. Before the DC magnetic field is applied, various directions of magnetization exist among individual magnetic domains in the ferromagnetic layer since the forms of magnetic domains differ from each other. There may be magnetic domains in which magnetization directions are opposite from each other. Subsequently, when a DC magnetic field is applied to the ferromagnetic layer in a direction along which a bias magnetic field should be applied, the magnetization direction of each magnetic domain is forcibly caused to align with the direction along which the DC magnetic field was applied. In this state, however, the magnetization directions are forcibly caused to align and thus are not in stable directions corresponding to the respective forms of magnetic domains. When the AC magnetic field is further applied to the ferromagnetic layer in a direction along which the bias magnetic field should be applied, the magnetization directions of magnetic domains are oriented in respective stable directions corresponding to the forms of magnetic domains, and are arranged so as to align with substantially the same direction. This makes it possible to inspect thin-film magnetic head properties while in a state where the magnetization direction of the hard bias layer is stable, whereby a high reliability is attained in results of the inspection. The present invention is not restricted by the foregoing operation, though.

Preferably, the DC magnetic field and AC magnetic field are applied after lapping for adjusting an MR height is carried out. Lapping may generate a processing distortion in the thin-film magnetic head, thereby making the magnetization direction unstable. Therefore, the effect of the present invention becomes remarkable when the DC magnetic field and AC magnetic field are applied after lapping.

An example of the property of the thin-film magnetic head to be inspected is an asymmetric property of output amplitude with respect to a change in the external magnetic field, i.e., asymmetry. The reproducing output of the thin-film magnetic head may be a property to inspect as well.

The method may further comprise the step of determining whether the thin-film magnetic head is favorable or not according to a property value obtained by the inspection and a predetermined reference value.

In this case, whether the thin-film magnetic head is favorable or not is determined by the property value itself. For example, it may be determined that the thin-film magnetic head is a favorable product when the value of asymmetry or reproducing output value obtained by the inspection clears a predetermined value, and a defective product when not.

Whether a thin-film magnetic head is favorable or not may be determined according to an amount of change of a property value obtained by the inspection of the thin-film magnetic head in a state where the DC magnetic field and AC magnetic field are applied thereto with respect to a reference property value obtained by the inspection of the thin-film magnetic head in a state where neither DC magnetic field nor AC magnetic field is applied.

In this case, whether the thin-film magnetic head is favorable or not is determined according to the amount of change in the property value after the application of DC and AC magnetic fields with respect to the reference property value before the application of DC and AC magnetic fields. For example, it may be determined that the thin-film magnetic head is a favorable product when the asymmetry or reproducing output after the application of DC and AC magnetic fields improves by at least a predetermined ratio than that before the application, and a defective product when not.

(2) The method of making a thin-film magnetic head in accordance with another aspect of the present invention comprises the steps of forming a thin-film magnetic head comprising a magnetoresistive film having a free layer whose magnetization direction changes depending on an external magnetic field and a ferromagnetic layer for applying a bias magnetic field to the free layer; applying a DC magnetic field to the ferromagnetic layer in a direction along which the bias magnetic field is applied; and thereafter applying an AC magnetic field to the ferromagnetic layer in a direction along which the bias magnetic field is applied.

These steps can stabilize the magnetization direction of a hard bias layer in the thin-film magnetic head. Though a mechanism by which the magnetization direction of the hard bias layer is stabilized has not been elucidated, the inventors infer as follows. In general, there is a stable magnetization direction corresponding to the form of a magnetic domain. For example, the magnetization direction tends to become stable when the magnetization is oriented in the longitudinal direction of the magnetic domain. Before the DC magnetic field is applied, various directions of magnetization exist among individual magnetic domains in the ferromagnetic layer since the forms of magnetic domains differ from each other. There may be magnetic domains in which magnetization directions are opposite from each other. Subsequently, when a DC magnetic field is applied to the ferromagnetic layer in a direction along which a bias magnetic field should be applied, the magnetization direction of each magnetic domain is forcibly caused to align with the direction along which the DC magnetic field was applied. In this state, however, the magnetization directions are forcibly caused to align and thus are not in stable directions corresponding to the respective forms of magnetic domains. When the AC magnetic field is further applied to the ferromagnetic layer in a direction along which the bias magnetic field should be applied, the magnetization directions of magnetic domains are oriented in respective stable directions corresponding to the forms of magnetic domains, and are arranged so as to align with substantially the same direction. As a consequence, the ferromagnetic layer becomes a hard bias layer with a stable magnetization direction. The present invention is not restricted by the foregoing operation, though.

Preferably, the DC magnetic field and AC magnetic field are applied after lapping for adjusting an MR height is carried out. Lapping may generate a processing distortion in the thin-film magnetic head, thereby making the magnetization direction unstable. Therefore, the effect of the present invention becomes remarkable when the DC magnetic field and AC magnetic field are applied after lapping.

The AC magnetic field may be applied a plurality of times. This can further improve the stability of magnetization direction in the hard bias layer.

DESCRIPTION OF THE PREFERRED EMBODIMENTS

In the following, preferred embodiments of the method of inspecting a thin-film magnetic head and the method of making a thin-film magnetic head in accordance with the present invention will be explained in detail with reference to the accompanying drawings.

Method of Inspecting Thin-Film Magnetic Head

Figure 1:
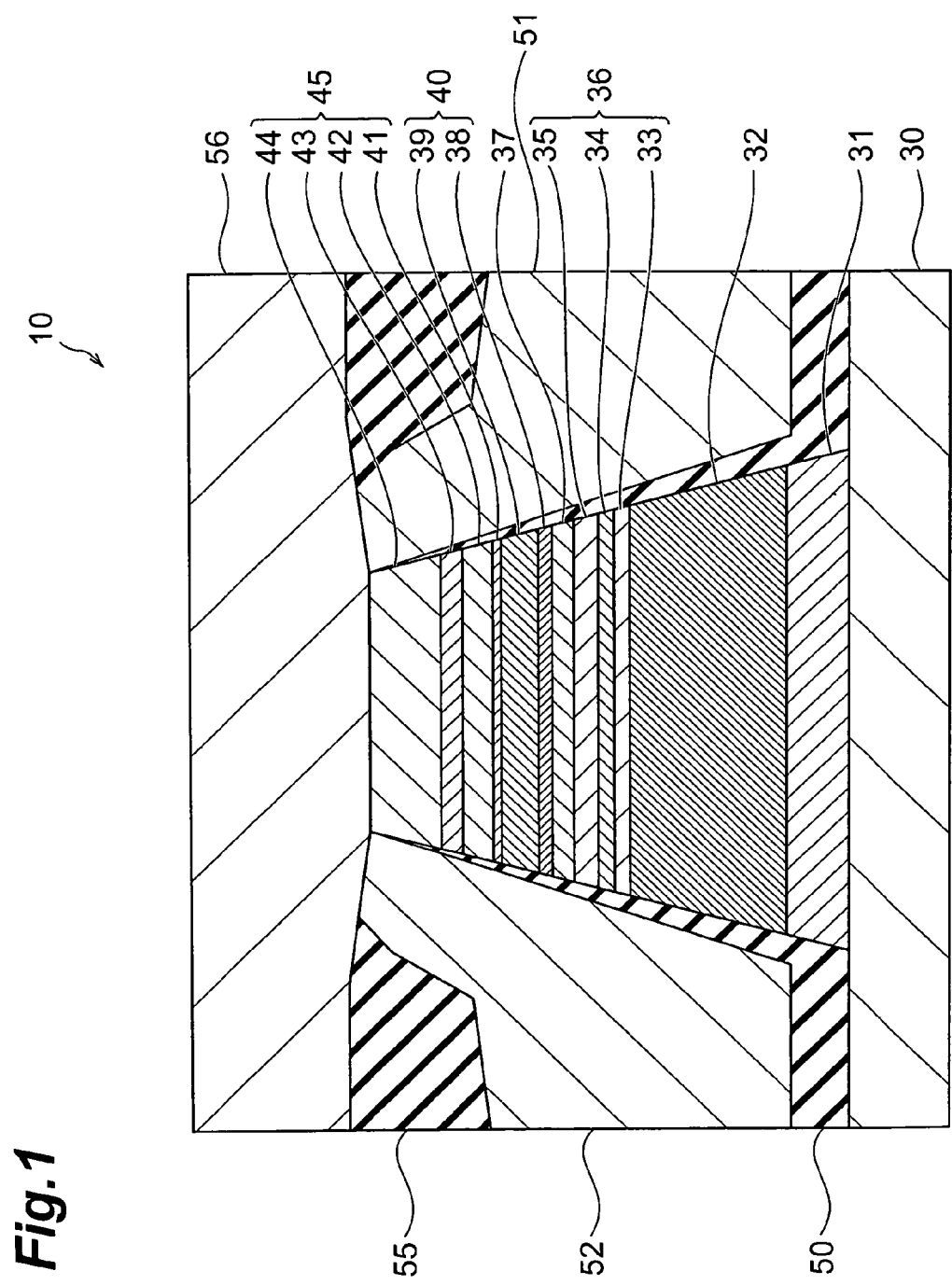
FIG. 1 is a view showing a thin-film magnetic head to be subjected to a property inspection.

First, the inspecting method will be explained. FIG. 1 is a view showing a thin-film magnetic head 10 to be subjected to a property inspection, i.e., a sectional view of a part slightly inside of an air bearing surface (ABS) opposing a recording medium. The thin-film magnetic head is a GMR utilizing a giant magnetoresistive effect, in which, on a lower electrode layer 30 formed on a support (not depicted), a buffer layer 31, an antiferromagnetic layer 32, a pinned layer 36 having a three-layer structure exchange-coupled to the antiferromagnetic layer 32 so as to exhibit a fixed magnetization direction, a nonmagnetic conductive layer 37, a free layer 40 having a two-layer structure whose magnetization direction changes depending on an external magnetic field, and a cap layer 45 having a four-layer structure are laminated in succession.

The thin-film magnetic head 10 employs a so-called CPP (Current Perpendicular to the Plane) structure in which a sense current flows in a layer thickness direction of the free layer 40. By way of a pair of electrode layers, the sense current is supplied to an MR film (magnetoresistive film) constituted by the free layer 40, nonmagnetic conductive layer 37, pinned layer 36, etc. As the electrode layers, the lower electrode layer 30 and an upper electrode layer 56 are provided. The upper electrode layer 56 is formed so as to cover the cap layer 45. Instead of the CPP structure, a CIP (Current In the Plane) structure in which a sense current flows in a plane direction may be employed as well. In the case of CIP structure, a pair of electrodes are provided on the left and right sides of the upper part of the MR film.

Formed on both sides of the laminate from the antiferromagnetic layer 32 to the cap layer 45 are a pair of hard bias layers 51, 52 (ferromagnetic layers) which apply a bias magnetic field to the free layer 40, so as to turn it into a single domain. An insulating layer 50 is disposed between the hard bias layer 51, 52 and the lower electrode layer 30. An insulating layer 55 is disposed between the hard bias layer 51, 52 and the upper electrode layer 56. The insulating layers 50, 55 can be formed from $Al_2O_3$ or the like, and prevent the sense current from leaking. The magnetoresistive film in accordance with this embodiment is constituted by the individual layers from the antiferromagnetic layer 32 to the free layer 40, the insulating layer 50, and the hard bias layers 51, 52.

Configurations of the individual layers will now be explained in detail. The lower electrode layer 30 can be formed from a conductive material such as Cu, Ta, Au, Al, NiFe, or NiFeCr, for example. The buffer layer 31 is formed on the lower magnetic layer 30 from a conductive material such as Cu, Ta, Au, Al, NiFe, or NiFeCr, for example, with a thickness of about 1 nm to about 10 nm, for example. The buffer layer 31 may comprise a single layer or a plurality of layers. The upper electrode layer 56 can be formed from the same material as with the lower electrode layer 30.

The antiferromagnetic layer 32 is a layer for fixing the magnetization direction of the pinned layer 36. The antiferromagnetic layer 32 has a thickness of about 5 rm to about 20 nm, and can be formed from PtMn, IrMn, or the like. The material for forming the antiferromagnetic layer 32 may be either of a type exhibiting an antiferromagnetic characteristic even without heat treatment, thereby inducing an exchange-coupled magnetic field, or of a type yielding an antiferromagnetic characteristic upon heat treatment.

The pinned layer 36 comprises a first ferromagnetic layer 33 in contact with the antiferromagnetic layer 32, a second ferromagnetic layer 35 whose magnetization direction is opposite from that of the first ferromagnetic layer 33, and a nonmagnetic spacer layer 34 disposed between the layers 33, 35, and has a so-called synthetic structure. Employing a synthetic structure as such can lower an unnecessary leakage magnetic field extending from the pinned layer 36 to the free layer 40.

The first ferromagnetic layer 33 and second ferromagnetic layer 35 in the pinned layer 36 can be formed from Co, CoFe, NiFe, CoFeNi, or the like, for example. The nonmagnetic spacer layer 34 is formed from a nonmagnetic material such as Ru, Rh, Re, Cr, or Zr, for example, with a thickness of about 0.2 nm to about 1.2 nm, for example. The nonmagnetic spacer layer 34 generates antiferromagnetic exchange coupling between the first ferromagnetic layer 33 and second ferromagnetic layer 35, thereby causing the layers 33, 35 to have respective magnetization directions opposite from each other. For example, the magnetization of the first ferromagnetic layer 33 is oriented to the front side of the paper in the drawing, whereas the magnetization of the second ferromagnetic layer 35 is fixed toward the backside of the paper.

The nonmagnetic conductive layer 37 is disposed between the pinned layer 36 and the free layer 40, and is formed from a conductive material such as Cu. The thickness of the nonmagnetic conductive layer is several nanometers, for example.

The free layer 40 is one whose magnetization direction changes depending on an external magnetic field such as leakage magnetic field of a hard disk, and can be formed from a ferromagnetic material such as Co, CoFe, NiFe, CoNiFe, or CoZrNb, for example, with a thickness of about 1 nm to about 10 nm. In this embodiment, the free layer 40 has a two-layer structure constituted by magnetic layers 38 and 39. The free layer 40 is turned into a single magnetic domain toward the left side in the drawing, for example, by the hard bias layers 51, 52. As the air bearing surface approaches a magnetization transient area of a hard disk, the magnetization direction of the free layer 40 shifts toward the backside or front side of the drawing. The ohmic value of sense current changes depending on the angle between the magnetization direction of the free layer 40 and the magnetization direction of the second ferromagnetic layer 35 in the pinned layer 36, whereby binary information of the hard disk can be reproduced according to this value. The hard bias layers 51, 52 can be formed from a ferromagnetic material such as CoTa, CoCrPt, or CoPt, for example. Individual layers 41 to 44 in the cap layer 45 are formed from a conductive material such as Ta, CoFe, or Ru, for example. The foregoing is the configuration of the thin-film magnetic head 10 in accordance with this embodiment.

A plurality of such thin-film magnetic heads are produced on a single wafer. Subsequently, the wafer is diced, so as to yield bars, each having thin-film magnetic heads arranged in a row. While in the bar state, the thin-film magnetic heads are lapped for adjusting their MR height, so as to determine an air bearing surface. After terminating such a process, the property inspection of an embodiment is started.

Figure 2:
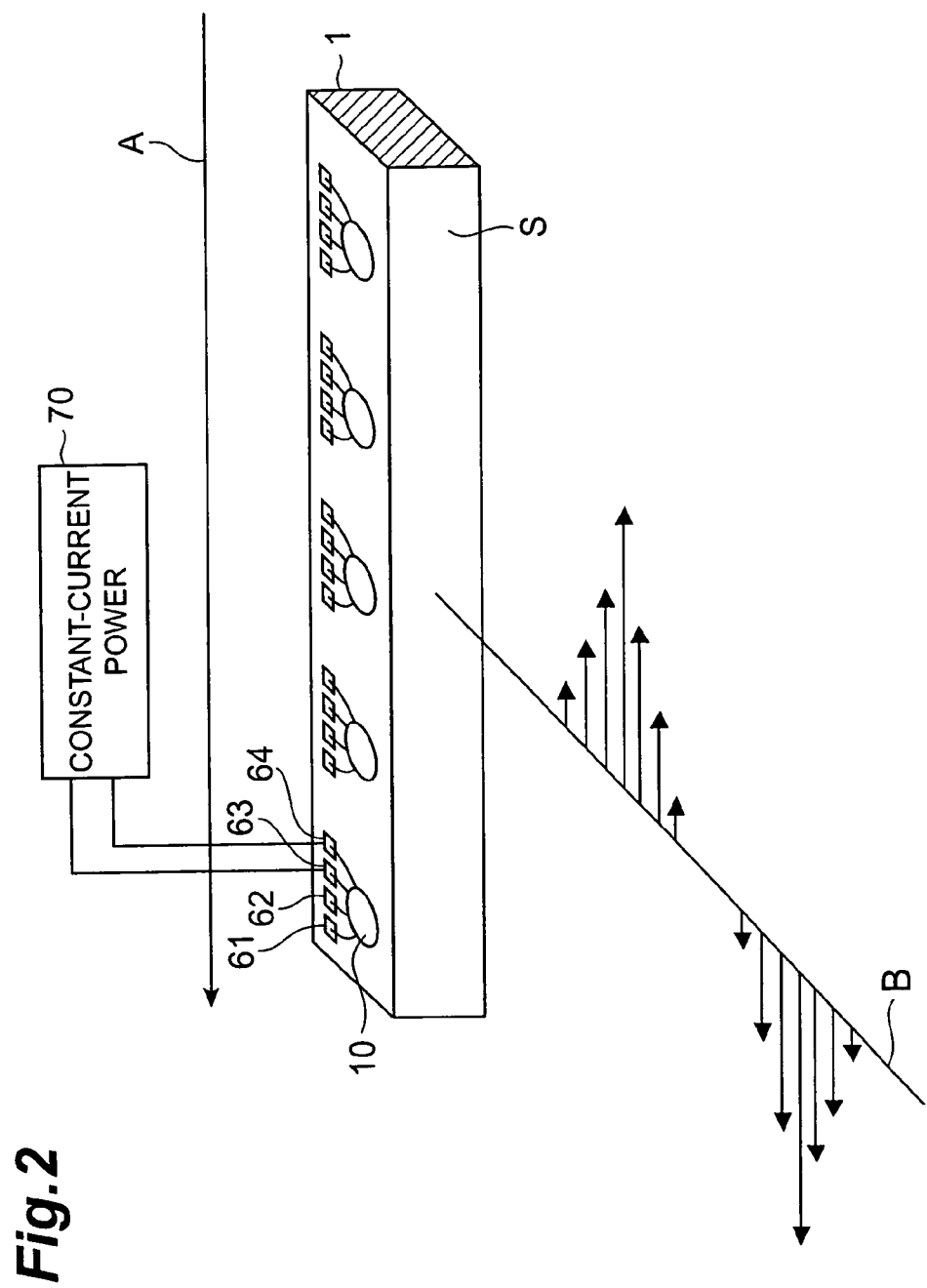
FIG. 2 is a view schematically showing a state where a DC magnetic field and an AC magnetic field are applied to thin-film magnetic heads in a bar before the property inspection.

With reference to FIG. 2, the method of inspecting a thin-film magnetic head in accordance with this embodiment will be explained. Here, so-called QST (Quasi Static Test) is carried out, so as to inspect properties such as an asymmetric property of output amplitude with respect to changes in the external magnetic field (so-called asymmetry) and reproducing output.

Numeral 1 in FIG. 2 indicates a bar in which a plurality of thin-film magnetic heads 10 are arranged in a row. Letter S refers to the air bearing surface. Connected to the thin-film magnetic head 10 are recording electrode pads 61, 62 and reproducing electrode pads 63, 64. The recording electrode pads 61, 62 are electrically connected to a recording device of a thin-film magnetic head which is not depicted, whereas the reproducing electrode pads 63, 64 are electrically connected to the lower electrode layer 30 and upper electrode layer 56 shown in FIG. 1, respectively.

First, such a bar 1 is set to an X-Y-Z table of an inspection apparatus. This inspection apparatus comprises a constant-current power supply 70 which supplies a sense current to the magnetoresistive film in the thin-film magnetic head 10, a magnetic field generator (not depicted) such as Helmholtz coil which applies an external magnetic field to the thin-film magnetic head 10, etc. The magnetic field generator can generate any of DC and AC magnetic fields by adjusting a current supplied o the Helmholtz coil. When supplying the magnetoresistive film with the sense current, a pair of probe pins connected to the constant-current power supply 70 are brought into contact with the reproducing electrode pads 63, 64, respectively.

Then, the following process will be carried out before inspecting a characteristic such as asymmetry. First, the magnetic field generator is actuated, so as to generate a DC magnetic field in a direction indicated by letter A in FIG. 2. This direction is made to coincide with the bias magnetic field applying direction in the free layer 40, whereby the hard bias layers 51, 52 (ferromagnetic layers) in the magnetoresistive film become application targets. In this embodiment, the DC magnetic field is applied in a direction along which the hard bias layers 51, 52 align with each other. The DC magnetic field is applied for about 10 seconds, for example, with a magnitude of about 8 to 10 kOe.

After the DC magnetic field application, an AC magnetic field is applied as indicated by letter B. As with the DC magnetic field, the AC magnetic field is applied in the direction along which the bias magnetic field is applied to the free layer 40, whereby the hard bias layers 51, 52 of the magnetoresistive film become application targets. The AC magnetic field is applied for about 10 milliseconds, for example, with a magnitude of about 300 to 500 Oe and a period of about 0.8 to 1.2 kHz.

Figure 3A:
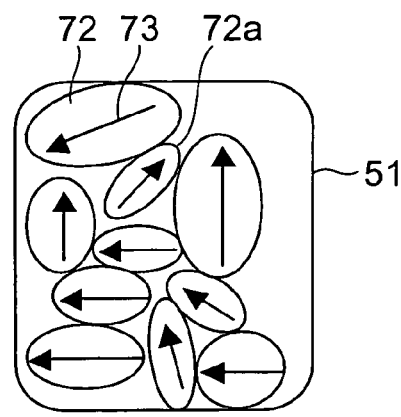
FIG. 3A is a view showing magnetization directions of a hard bias layer before a DC magnetic field is applied thereto.
Figure 3B:
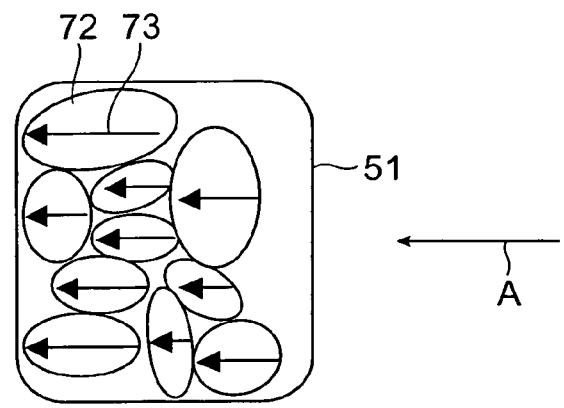
FIG. 3B is a view showing magnetization directions of the hard bias layer after the DC magnetic field is applied thereto.
Figure 3C:
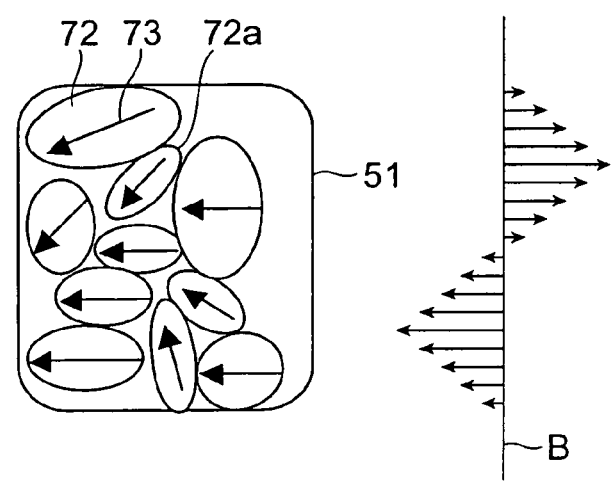
FIG. 3C is a view showing magnetization directions of the hard bias layer after an AC magnetic field is applied thereto.

With reference to FIGS. 3A to 3C, operations and effects obtained when applying such DC and AC external magnetic fields will be explained. Here, the following operations are inferred by the inventors, and do not restrict the present invention.

FIG. 3A shows magnetic domains and their magnetization directions before applying DC and AC magnetic fields. This drawing is schematically illustrated for understanding the invention, and does not always represent accurate states of the magnetic domains. In the drawing, numeral 72 refers to a magnetic domain, whereas an arrow 73 there in indicates a magnetization direction. A direction in which magnetization is stabilized is determined by the form of each magnetic domain. Specifically, the longitudinal direction of the magnetic domain is a magnetization stabilizing direction. In the depicted stage, the individual magnetic domains 72 have various magnetization directions. For example, the magnetization of the magnetic domain 72a is in a direction opposite from the magnetization of other magnetic domains (i.e., directed opposite from the side where the free layer 40 is located). In the drawing, the free layer 40 and hard bias layer 52 are located on the left side of the hard bias layer 51.

FIG. 3B shows a state after the DC magnetic field is applied to the hard bias layer 51. The magnetization directions of the magnetic domains are forcibly caused to align with a direction in which the DC magnetic field was applied. In this state, however, the magnetization directions are forcibly aligned, and thus are not in stable directions corresponding to the respective forms of the magnetic domains 72.

FIG. 3C shows a state after the AC magnetic field is applied to the hard bias layer 51. The individual magnetic domains have magnetization directions which are stable in conformity to the respective forms of the magnetic domains, and are arranged so as to be oriented in substantially the same direction. For example, the magnetization direction of the magnetic domain 72a is oriented to the free layer 40 (left side in the drawing) as in the other magnetic domains. The same phenomenon occurs in the hard bias layer 52 as well.

Since properties of the thin-film magnetic head 10 can be inspected while in a state where the magnetization directions of the hard bias layers 51, 52 are made stable as such, the result of inspection yields a high reliability in this embodiment.

In general, lapping for adjusting the MR height may generate a processing distortion in the thin-film magnetic head, thereby making magnetization directions unstable. For this matter, in this embodiment, DC and AC magnetic fields are applied in the directions mentioned above after lapping as mentioned above. This can eliminate the unstableness in magnetization directions caused by lapping. When DC and AC magnetic fields are applied after lapping as such, the effect of the present invention becomes remarkable in particular.

Specific details of the property inspection will now be explained. For inspecting a property, the magnetic field generator applies an external magnetic field to the thin-film magnetic head 10 in its track width direction while the constant-current power supply 70 supplies a sense current thereto. Subsequently, a property such as an asymmetric property of output amplitude with respect to changes in the external magnetic field (so-called asymmetry) or reproducing output is inspected. Asymmetry A is calculated by the following expression (1):

$$A=(V1-V2)/(V1+V2)\times 100(\%) \quad (1)$$

where V1 and V2 are positive and negative amplitudes in the AC output, respectively.

After calculating a property value of asymmetry, reproducing output, or the like, it is determined whether the thin-film magnetic head is favorable or not. When thus obtained asymmetry value is not higher than a predetermined reference value or when the reproducing output value is not lower than a reference value, it is determined that the thin-film magnetic head is a favorable product. When the asymmetry value exceeds its reference value or the reproducing output value is smaller than its reference value, on the other hand, it is determined that the thin-film magnetic head is a defective product. Since the property value obtained by this embodiment has a high reliability, such a determination yields a high accuracy.

The following technique may be employed in place of the technique in which obtained property values themselves are compared with their reference values as mentioned above. First, the thin-film magnetic head in a state with neither the DC magnetic field nor the AC magnetic field applied thereto is inspected, so as to determine a property value of asymmetry, reproducing output, or the like, and thus obtained property value is taken as a reference property value. Subsequently, the DC magnetic field and AC magnetic field are applied to the thin-film magnetic head from which the reference property value was determined, and a property value of asymmetry, reproducing output, or the like is determined. Then, according to the amount of change in property value with respect to the reference property value, it is determined whether the thin-film magnetic head is favorable or not. When asymmetry is inspected, for example, it is determined that the thin-film magnetic head is a favorable product if the amount of change in property value with respect to the reference property value is not greater than a predetermined value, i.e., if the asymmetry decreases by the predetermined value, and a defective product if the amount of change exceeds the predetermined value. When the reproducing output is inspected, it is determined that the thin-film magnetic head is a favorable product if the amount of change in property value with respect to the reference property value is not smaller than a predetermined value, i.e., if the reproducing output increases, and a defective product if the amount of change is less than the predetermined value.

Results of inspection of the thin-film magnetic head will now be explained.

First, a plurality of thin-film magnetic heads were formed on a wafer. Each of the thin-film magnetic heads formed here has the same configuration as that shown in FIG. 1, but in a CIP structure in which a sense current flows in a plane direction of the film. Table 1 shows the composition of this thin-film magnetic head and thicknesses of individual layers therein. Numerals in the table correspond to those in FIG. 1. Here, electrodes were formed from Au.

TABLE 1

| NUMERAL | LAYER | MATERIAL | THICKNESS (nm) |
|---|---|---|---|
| 51, 52 | HARD BIAS LAYER | CoCrPt | — |
| 44(45) | CAP LAYER | Ta | 6.0 |
| 43(45) | CAP LAYER | CoFe | 2.0 |
| 42(45) | CAP LAYER | Ta | 2.5 |
| 41(45) | CAP LAYER | Ru | 0.5 |
| 39(40) | FREE LAYER | NiFe | 3.0 |
| 38(40) | FREE LAYER | CoFe | 1.0 |
| 37 | NONMAGNETIC CONDUCTIVE LAYER | Cu | 1.9 |
| 35(36) | PINNED LAYER | CoFe | 2.0 |
| 34(36) | PINNED LAYER | Ru | 0.8 |
| 33(36) | PINNED LAYER | CoFe | 1.5 |
| 32 | ANTIFERROMAGNETIC LAYER | PtMn | 13.0 |
| 31 | BUFFER LAYER | NiCr | 5.0 |

Then, magnetization was once effected in this wafer stage, so as to form a bias magnetic field in the free layer. The magnetic field applied here was a DC magnetic field with a magnitude of about 10 kOe. Subsequently, bars each comprising thin-film magnetic heads arranged in a row were obtained by dicing, and lapping was carried out so as to define ABS, thereby yielding a desirable MR height Thus obtained bars were set into the inspection apparatus in these examples, so as to be subjected to QST (Quasi Static Test) Six bars in total were subjected to the property inspection.

In the QST, the asymmetric property of output amplitude with respect to changes in the external magnetic field (so-called asymmetry) and reproducing output were inspected. As shown in Table 2, QST was carried out every time when a DC or AC magnetic field was applied, etc. In each QST, an external magnetic field with a magnitude of 50 to 200 Oe and a frequency of about 80 Hz was applied to the thin-film magnetic head while a sense current at about 2 to 4 mA was supplied thereto.

TABLE 2

| STEP | QST(TIMES) | EXTERNAL ACTION |
|---|---|---|
| 1 | QST1 | — |
| 2 | — | DC MAGNETIC FIELD APPLICATION |
| 3 | QST2 | — |
| 4 | — | AC MAGNETIC FIELD APPLICATION |
| 5 | QST3 | — |
| 6 | — | AC MAGNETIC FIELD APPLICATION |
| 7 | QST4 | — |
| 8 | — | AC MAGNETIC FIELD APPLICATION |
| 9 | QST5 | — |
| 10 | — | AC MAGNETIC FIELD APPLICATION (7 TIMES) |
| 11 | QST6 | — |
| 12 | — | THERMAL SHOCK TEST & HIGH-TEMPERATURE/ HIGH-HUMIDITY TEST |
| 13 | QST7 | — |

Initially, the first QST (QST1) shown at step 1 was carried out before the magnetic field application in the bar state. The QST1 was a test as a comparative example. Subsequently, at step 2, the magnetic field generator was actuated, so as to apply a DC magnetic field to the bar. The direction of the DC magnetic field was caused to coincide with the bias magnetic field applying direction in the free layer. The DC magnetic field was applied for 10 seconds with a magnitude of 8 koe. After applying the DC magnetic field, QST2 carried out at step 3. The QST2 was also a test as a comparative example.

At step 4, an AC magnetic field was applied to the bar in a direction equal to the DC magnetic field applying direction. The AC magnetic field was applied for 10 milliseconds at a frequency of 1 kHz with a maximum value of 400 Oe. After applying the AC magnetic field, QST3 was carried out at step 5. Each QST after the QST3 was an inspection of the present invention, and thus was a test as an example.

Further, at step 6, the AC magnetic field was applied to the bar under the same condition as with step 4. Thereafter, at step 7, QST4 was carried out. Subsequently, at step 8, the AC magnetic field was applied to the bar under the same condition as with step 4. Then, at step 9, QST5 was carried out.

At step 10, the AC magnetic field was applied seven times under the condition of step 4. Thus, the AC magnetic field was applied 10 times in the bar state. Thereafter, at step 11, QST6 was carried out.

At step 12, a thermal shock test and a high-temperature/ high-humidity test were carried out in this order. In the thermal shock test, a temperature change was continuously provided for 24 hours at a rate of 1 cycle/hr within the temperature range of −40° C. to 70° C. In the high-temperature/high-humidity test, the bar was left for 24 hours in an environment at a temperature of 60° C. with a humidity of 85%. Thereafter, at step 13, QST7 was carried out.

EXAMPLE 1

First, with reference to FIGS. 4 to 9, results of asymmetry property in each of the above-mentioned QSTs will be explained. The following results refer to those of thin-film magnetic heads formed in one of a plurality of bars.

Figure 4:
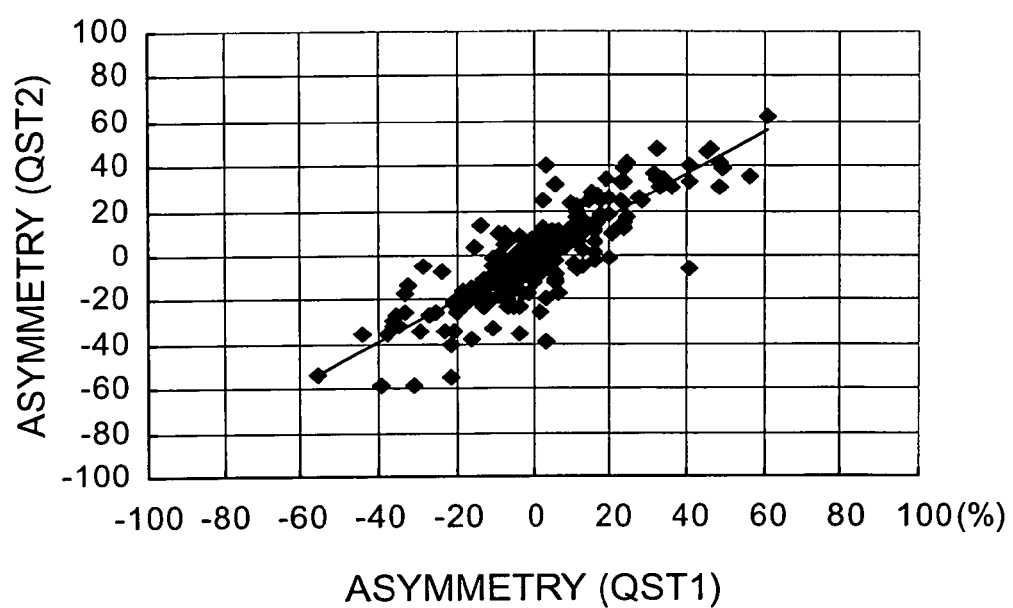
FIG. 4 is a graph showing changes in asymmetry between before and after a DC magnetic field application.

FIG. 4 is a graph whose abscissa and ordinate indicate measurement results of QST1 and QST2, respectively. Namely, this graph shows changes in asymmetry between before and after a DC magnetic field application. Though it will be ideal if values of asymmetry do not change between before and after an external magnetic field or the like is applied (i.e., it will be preferred if plotted points concentrate at the line in the graph), the values of asymmetry fluctuate greatly between before and after the DC magnetic field application as can be seen from this graph. Hence, the amount of change in asymmetry was large.

Figure 5:
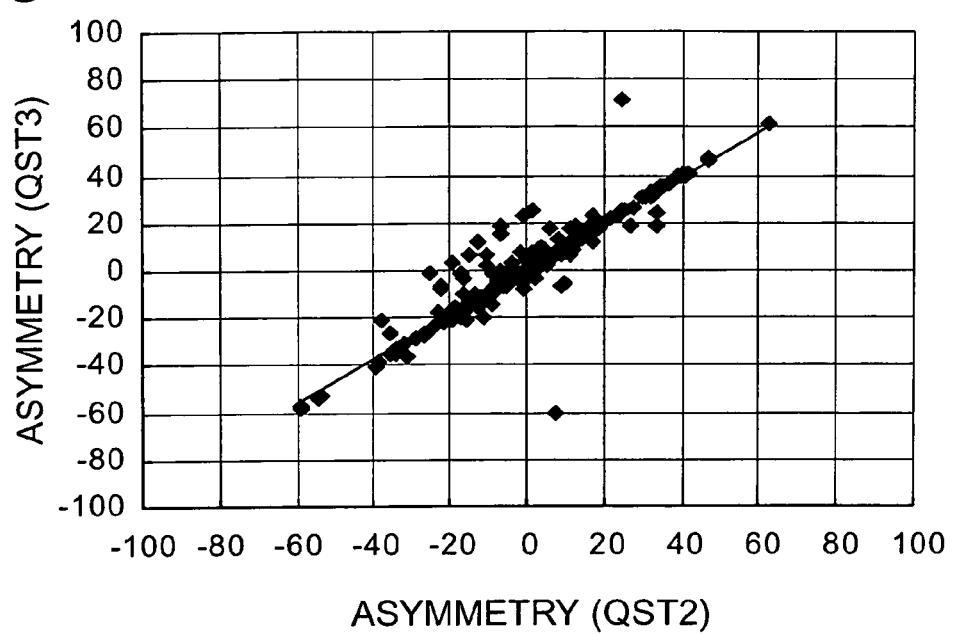
FIG. 5 is a graph showing changes in asymmetry between before and after a DC magnetic field application.

FIG. 5 is a graph whose abscissa and ordinate indicate measurement results of QST2 and QST3, respectively. Namely, the graph shows changes in asymmetry between before and after an AC magnetic field application. Fluctuations in values of asymmetry were seen here and there in this case as well. From this result, it has been found that, if a DC magnetic field is applied alone, values of asymmetry vary when an external magnetic field (the AC magnetic field at step 4 here) is applied thereafter.

Figure 6:
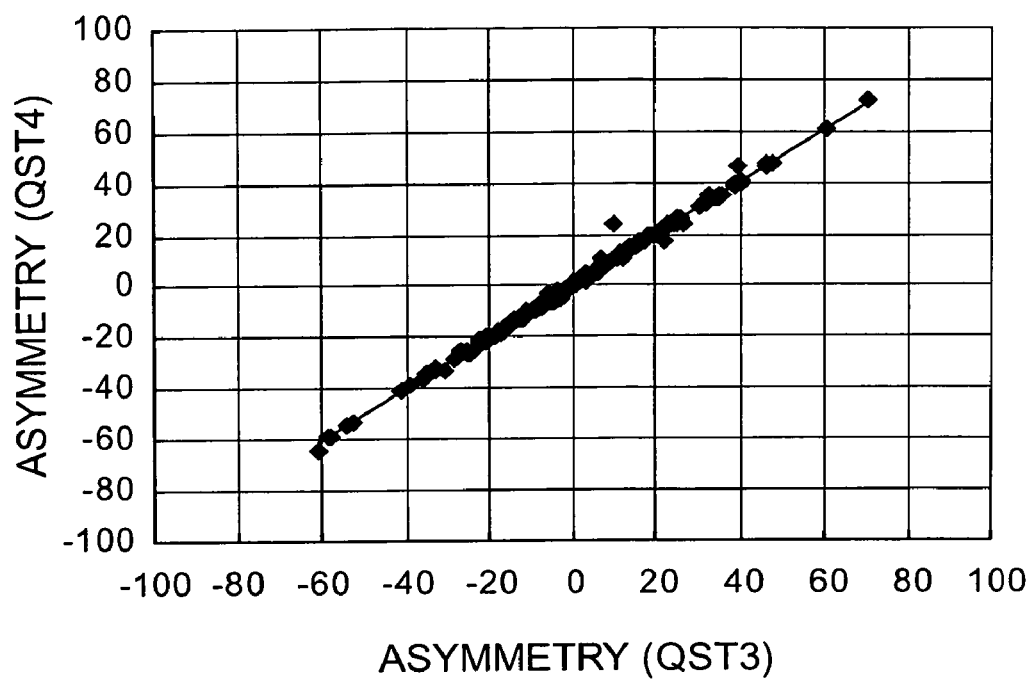
FIG. 6 is a graph showing changes in asymmetry between after the first AC magnetic field application and after the second AC magnetic field application.

FIG. 6 is a graph whose abscissa and ordinate indicate measurement results of QST3 and QST4, respectively. In this case, changes in asymmetry are seen to be suppressed slightly between before and after the second AC magnetic field application (between before and after step 6). Namely, it has been verified that, after the AC magnetic field is applied in the same direction as with the DC magnetic field at step 4, asymmetry hardly changes even when an external magnetic field (corresponding to the AC magnetic field at step 6) is applied thereafter.

Figure 7:
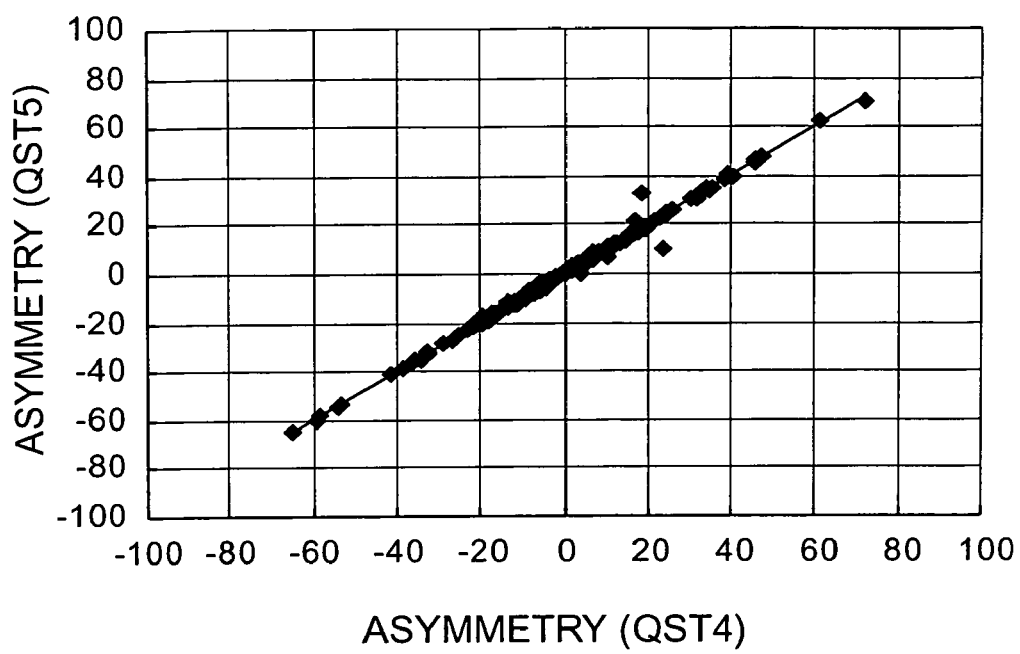
FIG. 7 is a graph showing changes in asymmetry between after the second AC magnetic field application and after the third AC magnetic field application.

FIG. 7 is a graph whose abscissa and ordinate indicate measurement results of QST4 and QST5, respectively. This graph shows that asymmetry is stable even after an AC magnetic field is further applied at step 8.

Figure 8:
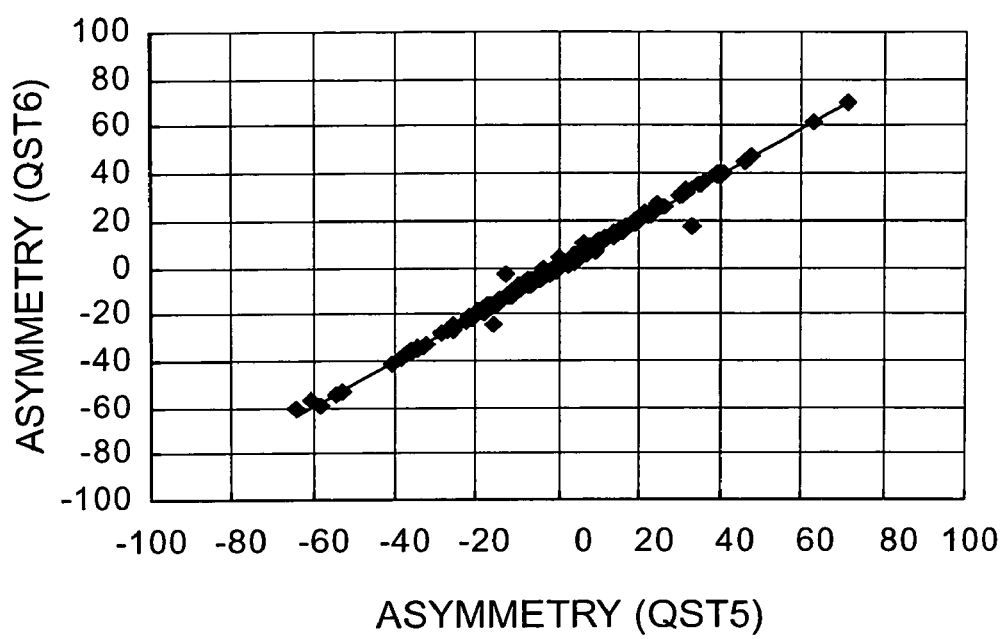
FIG. 8 is a graph showing changes in asymmetry between after the third AC magnetic field application and after the tenth AC magnetic field application.

FIG. 8 is a graph whose abscissa and ordinate indicate measurement results of QST5 and QST6, respectively. Namely, this graph represents changes in asymmetry between before and after seven AC magnetic field applications in addition. This graph shows that asymmetry hardly changes between before and after the seven AC magnetic field applications.

Figure 9:
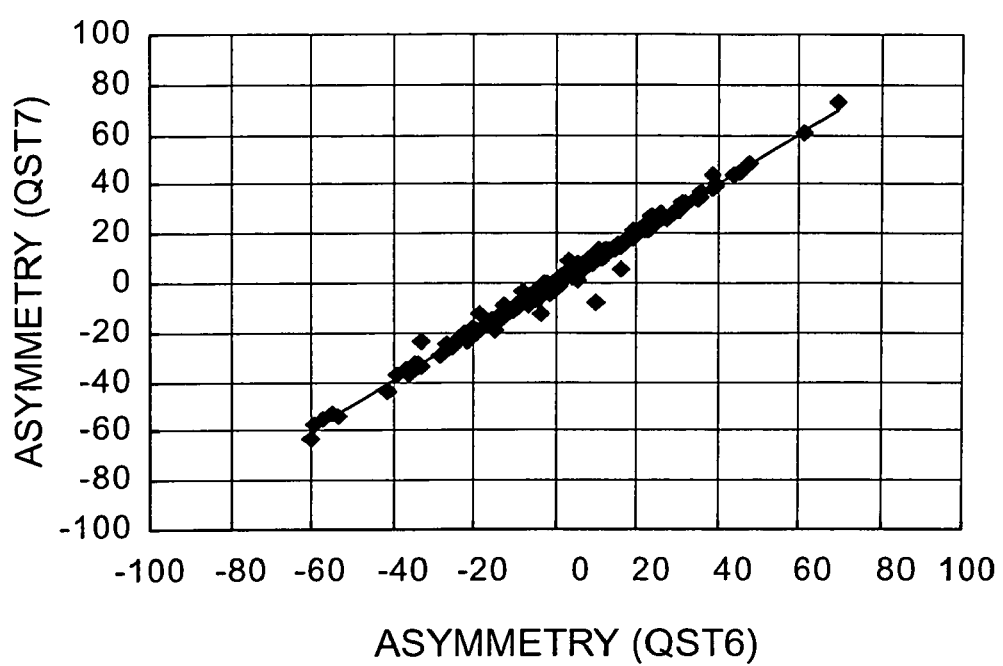
FIG. 9 is a graph showing changes in asymmetry between after the tenth AC magnetic field application and after a thermal shock test and a high-temperature/high-humidity test.

FIG. 9 is a graph whose abscissa and ordinate indicate measurement results of QST6 and QST7, respectively. Namely, the graph represents changes in asymmetry between before and after a thermal shock test and a high-temperature/high-humidity test. This graph shows that asymmetry hardly changes. This has verified that the thin-film magnetic head in which the DC and AC magnetic fields are applied in the directions mentioned above as in this embodiment are excellent in resistances to thermal shock and high temperature/high humidity.

EXAMPLE 2

With reference to FIGS. 10 to 15, results of reproducing output in each of the above-mentioned QSTs will now be explained.

Figure 10:
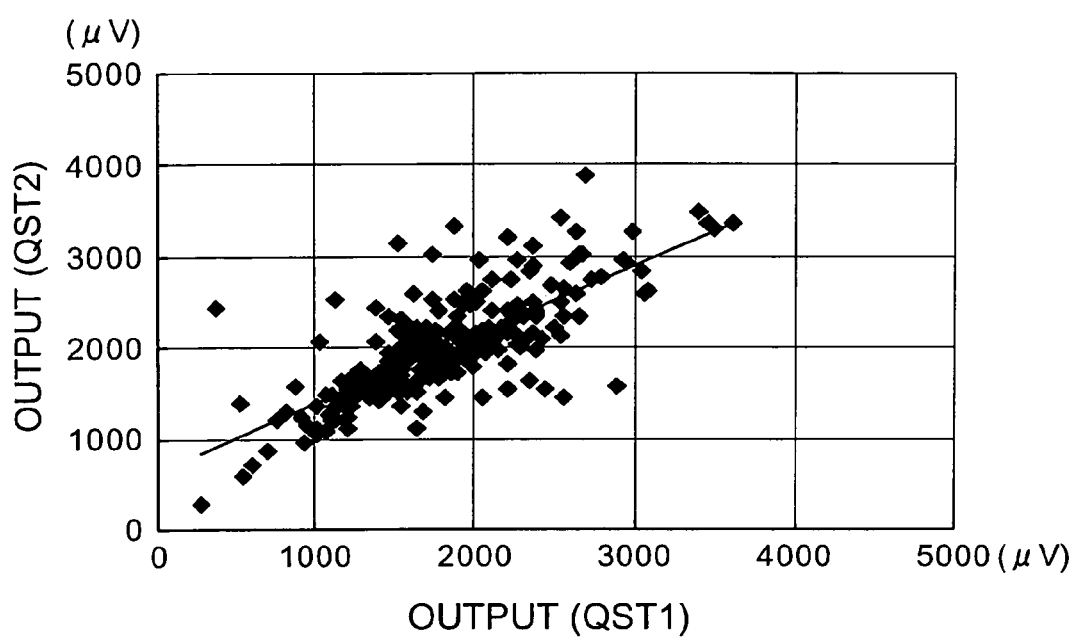
FIG. 10 is a graph showing changes in reproducing output between before and after a DC magnetic field application.

FIG. 10 is a graph whose abscissa and ordinate indicate measurement results of QST1 and QST2, respectively. Namely, this graph shows changes in reproducing output between before and after the DC magnetic field application at step 2. Though it will be ideal if values of reproducing output do not change between before and after an external magnetic field or the like is applied, the values of reproducing output fluctuate greatly between before and after the DC magnetic field application as can be seen from this graph.

Figure 11:
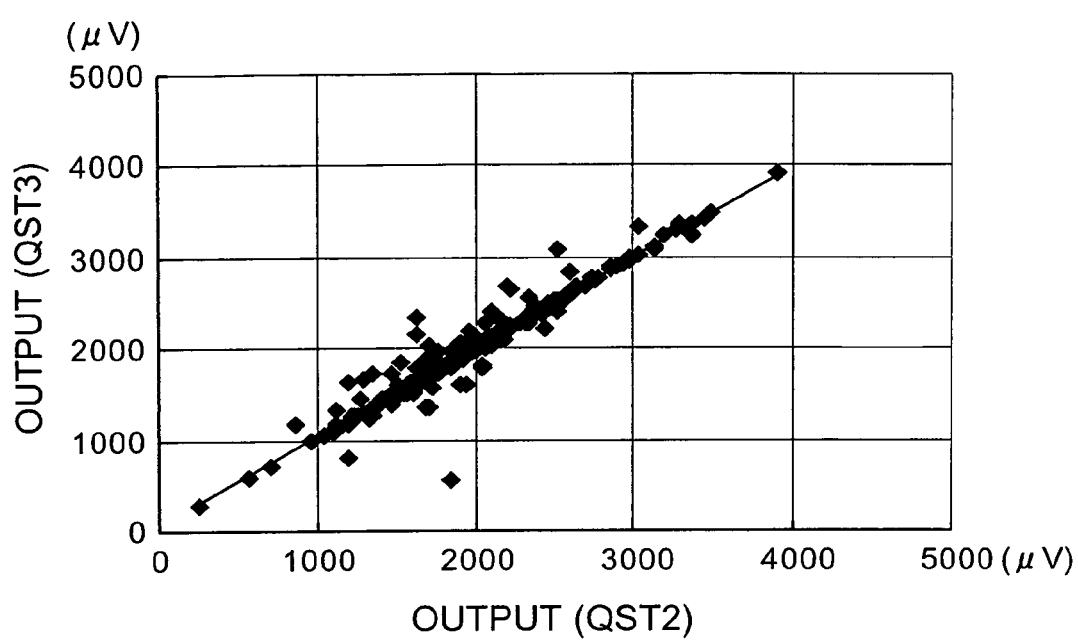
FIG. 11 is a graph showing changes in reproducing output between before and after an AC magnetic field application.

FIG. 11 is a graph whose abscissa and ordinate indicate measurement results of QST2 and QST3, respectively. Namely, the graph shows changes in reproducing output between before and after an AC magnetic field application. Fluctuations in values of reproducing output were seen here and there in this case as well. From this result, it has been found that, if a DC magnetic field is applied alone, values of reproducing output vary when an external magnetic field (the AC magnetic field at step 4 here) is applied thereafter.

Figure 12:
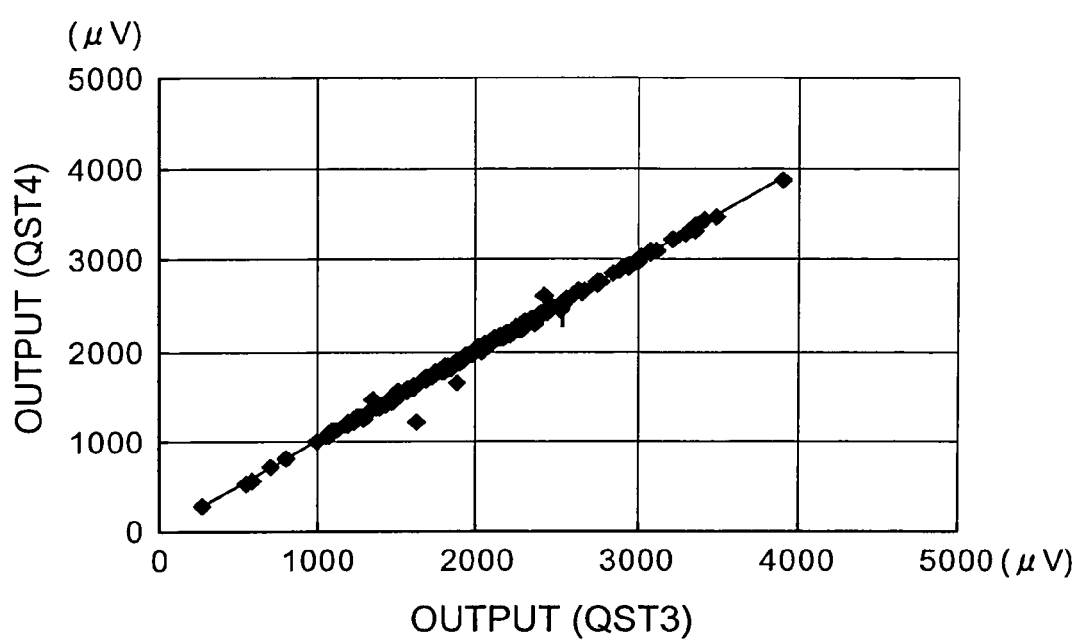
FIG. 12 is a graph showing changes in reproducing output between after the first AC magnetic field application and after the second AC magnetic field application.

FIG. 12 is a graph whose abscissa and ordinate indicate measurement results of QST3 and QST4, respectively. In this case, changes in reproducing output are seen to be suppressed slightly between before and after the second AC magnetic field application (between before and after step 6). Namely, it has been verified that, after the AC magnetic field is applied in the same direction as with the DC magnetic field at step 4, reproducing output hardly changes even when an external magnetic field (corresponding to the AC magnetic field at step 6) is applied thereafter.

Figure 13:
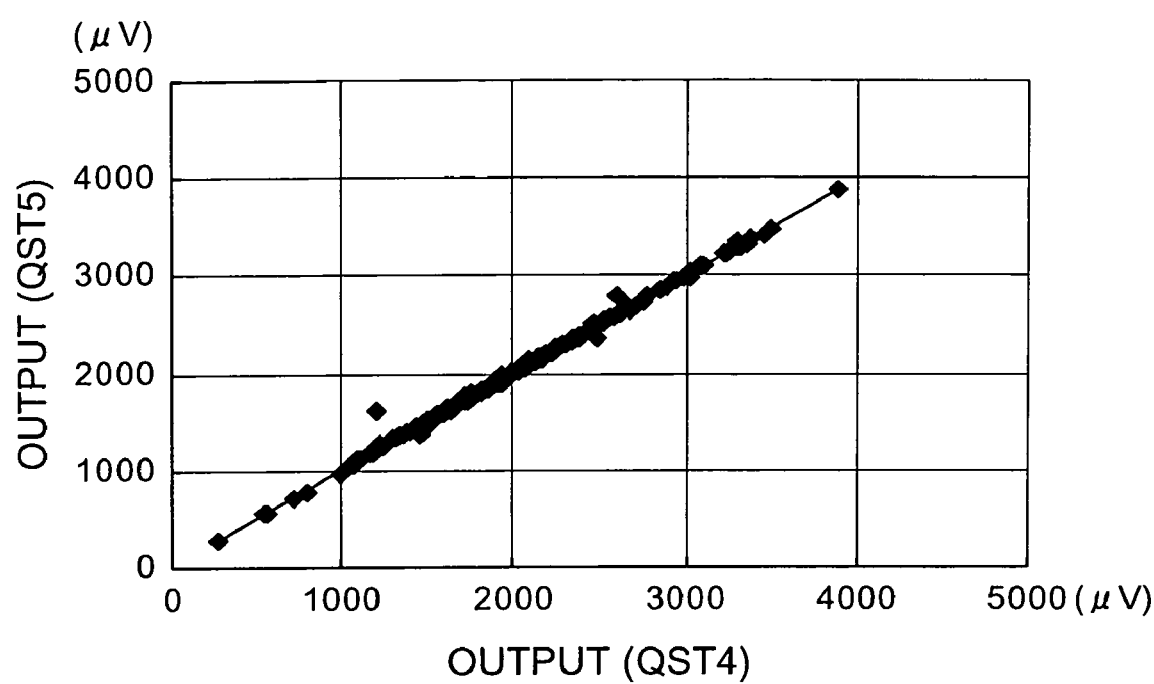
FIG. 13 is a graph showing changes in reproducing output between after the second AC magnetic field application and after the third AC magnetic field application.

FIG. 13 is a graph whose abscissa and ordinate indicate measurement results of QST4 and QST5, respectively. This graph shows that reproducing output is stable even after an AC magnetic field is further applied at step 8.

Figure 14:
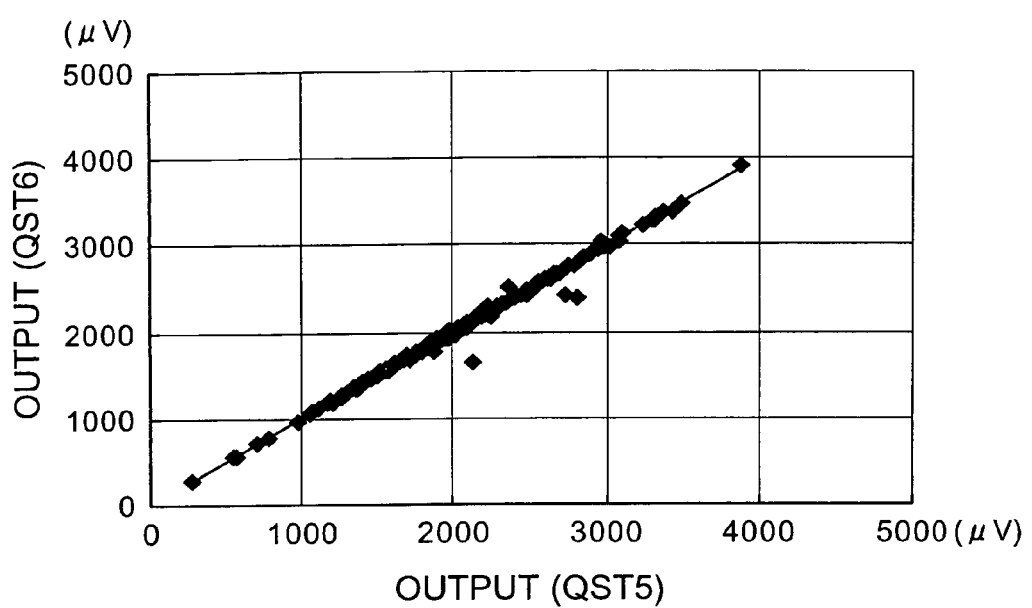
FIG. 14 is a graph showing changes in reproducing output between after the third AC magnetic field application and after the tenth AC magnetic field application.

FIG. 14 is a graph whose abscissa and ordinate indicate measurement results of QST5 and QST6, respectively. Namely, this graph represents changes in reproducing output between before and after seven AC magnetic field applications in addition. This graph shows that reproducing output hardly changes between before and after the seven AC magnetic field applications.

Figure 15:
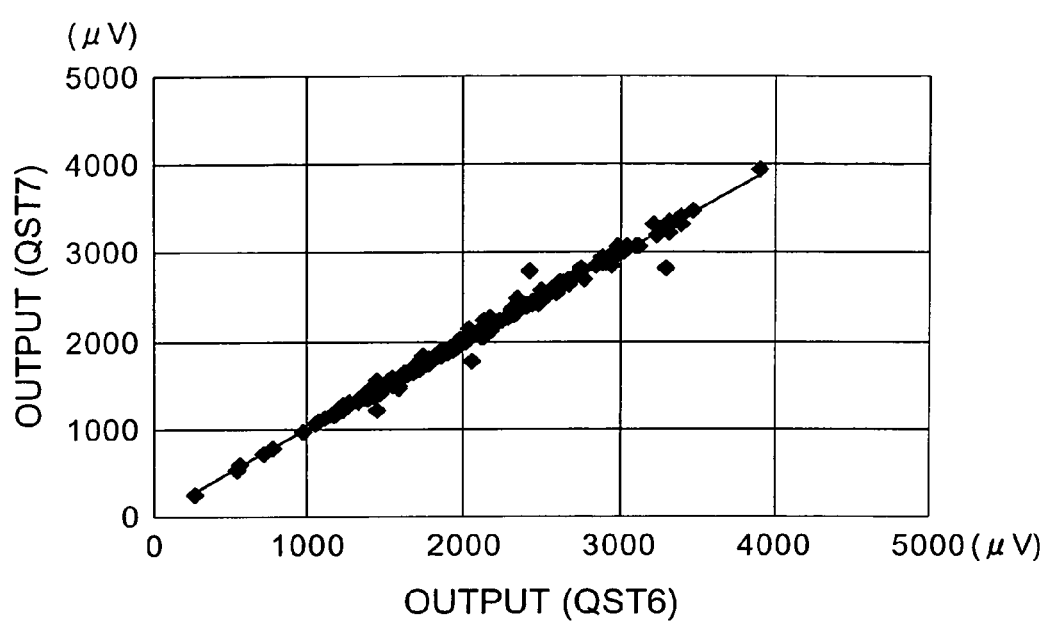
FIG. 15 is a graph showing changes in asymmetry between after the tenth AC magnetic field application and after a thermal shock test and a high-temperature/high-humidity test.

FIG. 15 is a graph whose abscissa and ordinate indicate measurement results of QST6 and QST7, respectively. Namely, the graph represents changes in reproducing output between before and after a thermal shock test and a high-temperature/high-humidity test. This graph shows that reproducing output hardly changes between before and after these tests.

EXAMPLE 3

With reference to FIGS. 16 to 19, MR loop characteristics of GMR films measured in the individual QSTs will now be explained.

Figure 16:
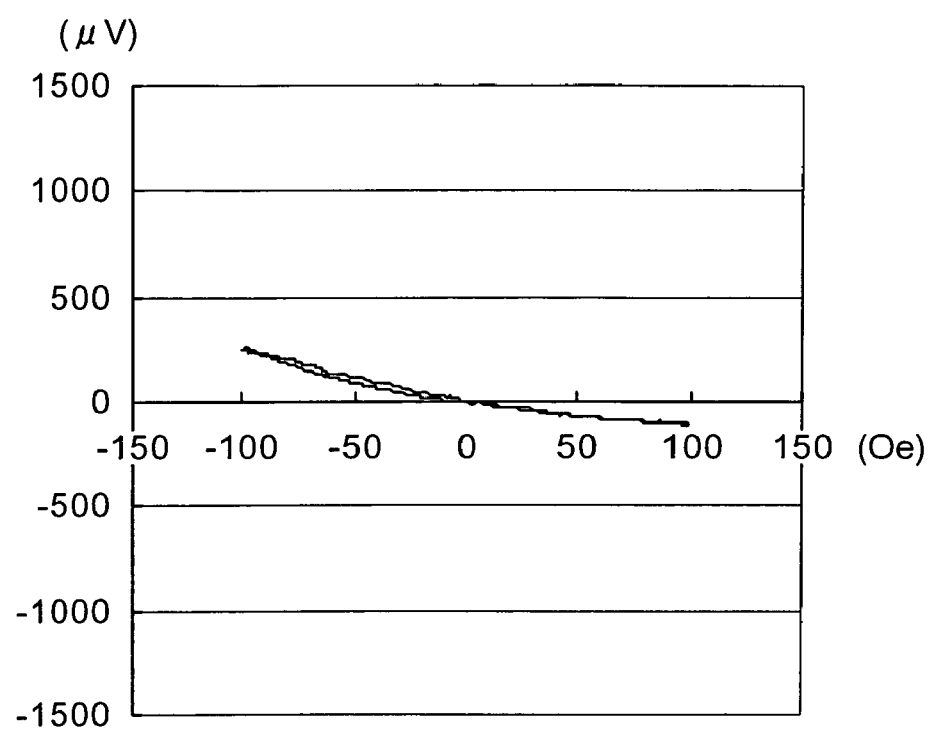
FIG. 16 is a chart showing an MR loop characteristic of a GMR film in QST1.

FIG. 16 shows the MR loop characteristic in the GMR film in QST1. The MR loop characteristic indicates a head output voltage with respect to an external magnetic field. The abscissa and ordinate indicate external magnetic field (Oe) and reproducing output voltage ($\mu$V), respectively. As can be seen from this graph, before applying the external magnetic field, the reproducing output voltage value is so low that it fails to reach a predetermined standard.

Figure 17:
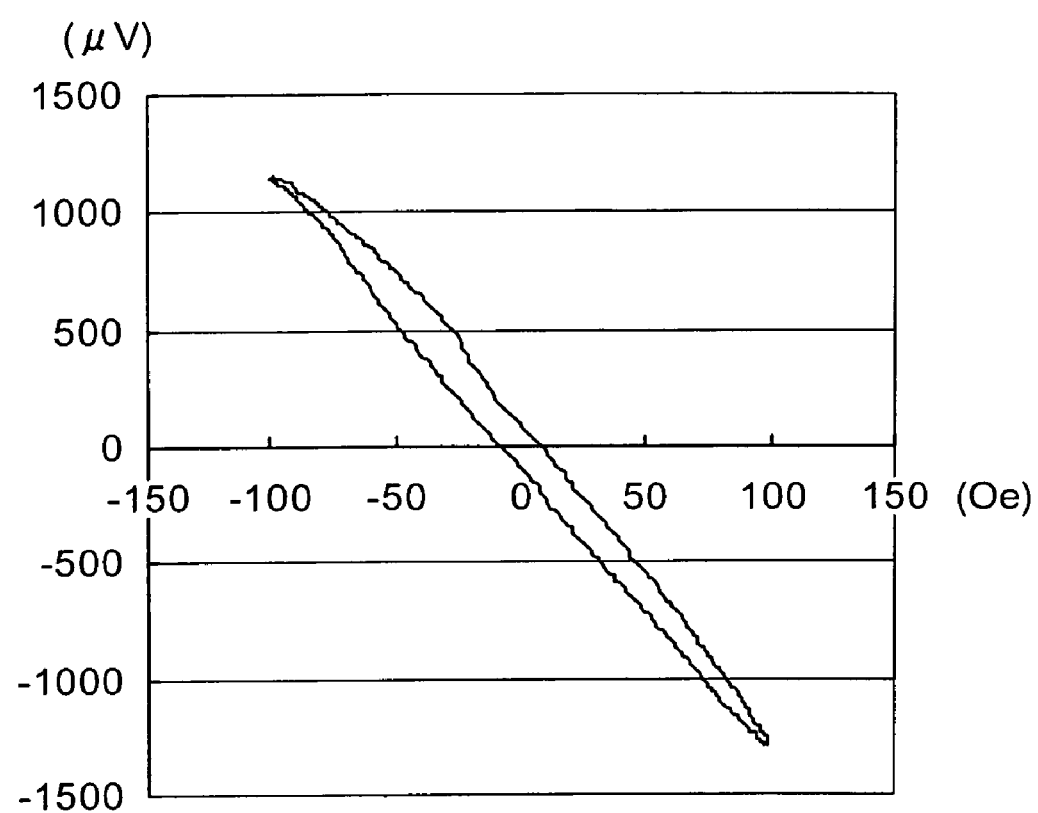
FIG. 17 is a chart showing an MR loop characteristic of the GMR film in QST2.

FIG. 17 shows the MR loop characteristic in QST2. The form of MR loop characteristic in this case greatly changes from that in FIG. 16 representing the state before the DC magnetic field application, and meets the standard.

Figure 18:
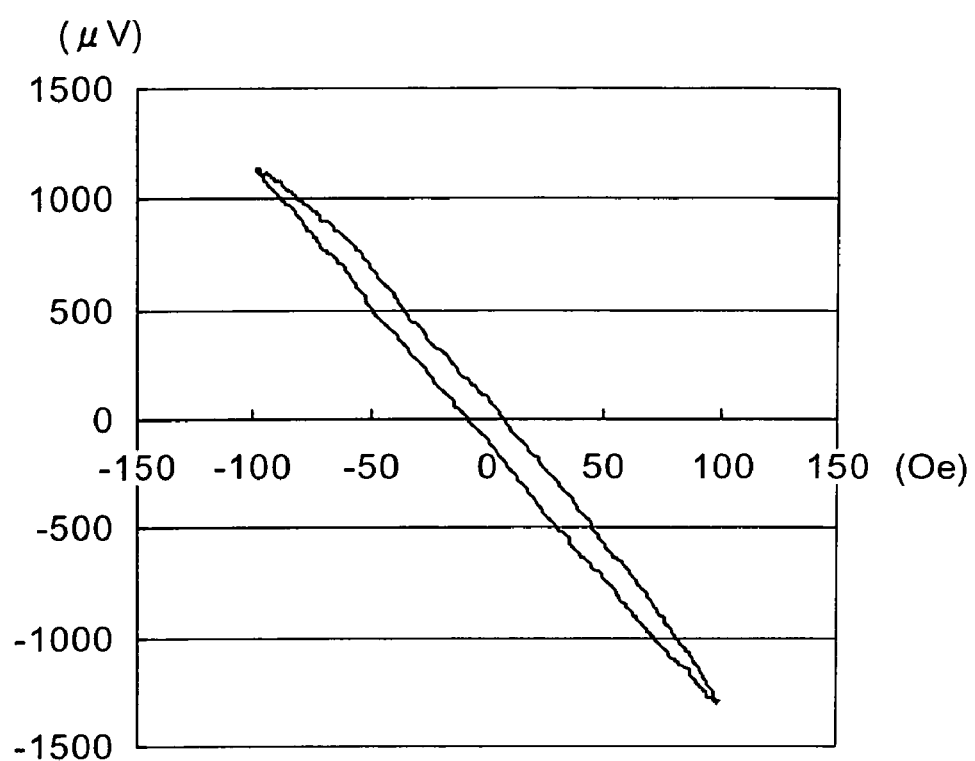
FIG. 18 is a chart showing an MR loop characteristic of the GMR film in QST3.

FIG. 18 represents the MR loop characteristic in QST3. This result shows that the MR loop characteristic after the DC magnetic field application is substantially maintained after the AC magnetic field is applied.

Figure 19:
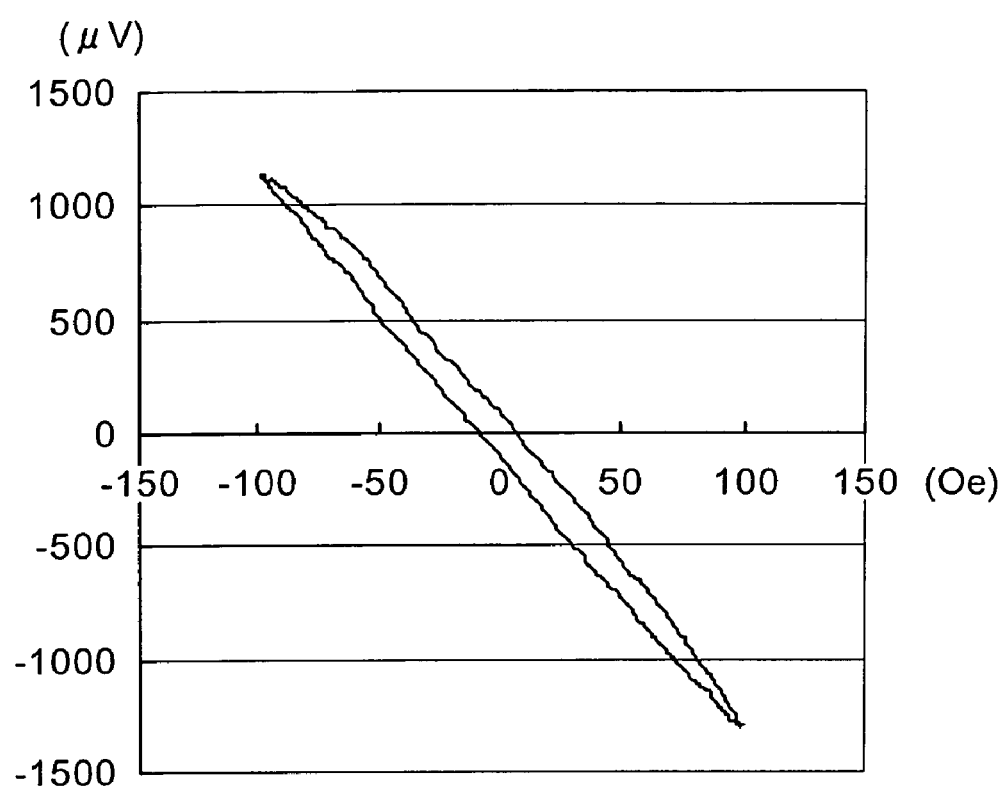
FIG. 19 is a chart showing an MR loop characteristic of the GMR film in QST7.

FIG. 19 represents the MR loop characteristic in QST7. This result shows that the MR loop characteristic is substantially maintained even after carrying out the thermal shock test and high-temperature/high-humidity test.

Though the thin-film magnetic heads exhibiting the foregoing MR loop characteristics failed to meet the standard in their initial states before the DC magnetic field application, they can finally be treated as favorable products meeting the standard. Namely, the inspecting method of the present invention can prevent thin-film magnetic heads which can inherently be treated as favorable products from being handled as defective products.

EXAMPLE 4

When the inspecting method of the present invention is employed, defective products can be detected according to MR loop characteristics after the AC application. The detecting process will now be explained with reference to FIGS. 20 to 27.

Figure 20:
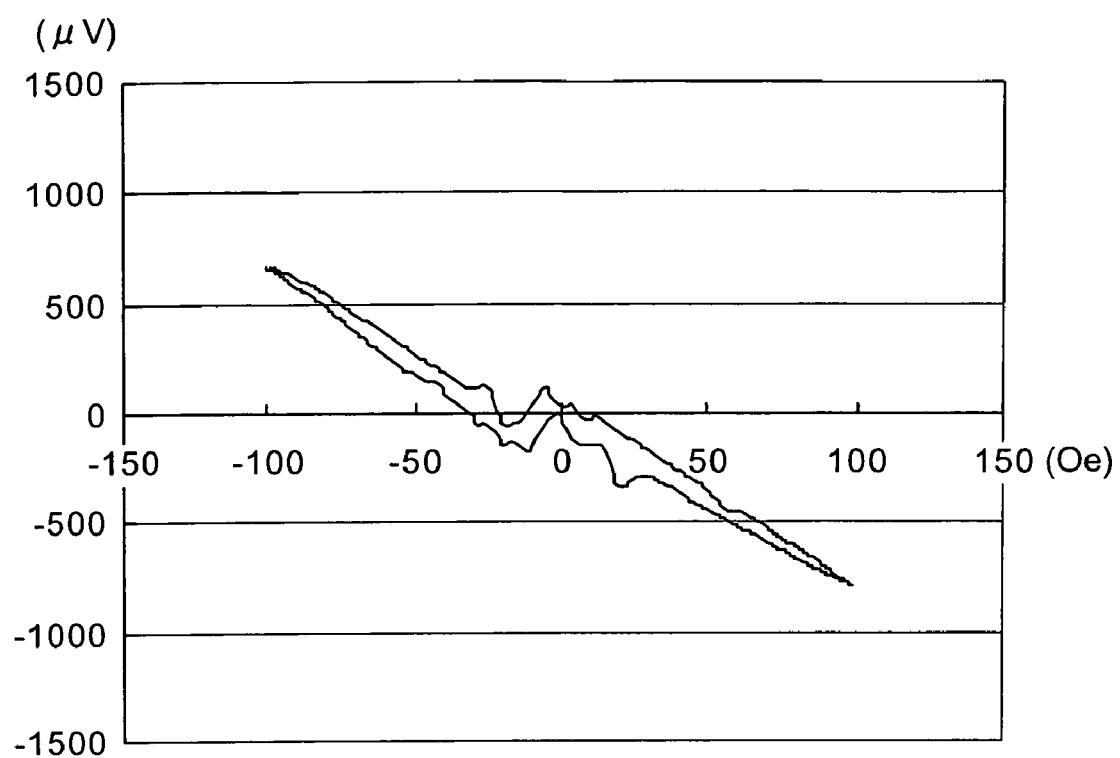
FIG. 20 is an explanatory view showing an example of detecting a defective product according to an MR loop characteristic after an AC application, representing an MR loop characteristic of the GMR film in QST1.

Initially, with reference to FIGS. 20 to 23, the first example will be explained. FIG. 20 shows the MR loop characteristic of the GMR film in QST1. Before the external magnetic field application, as can be seen from this graph, the value of reproducing output voltage is low, and a regular MR loop characteristic is not established, whereby the thin-film magnetic head does not meet a predetermined standard.

Figure 21:
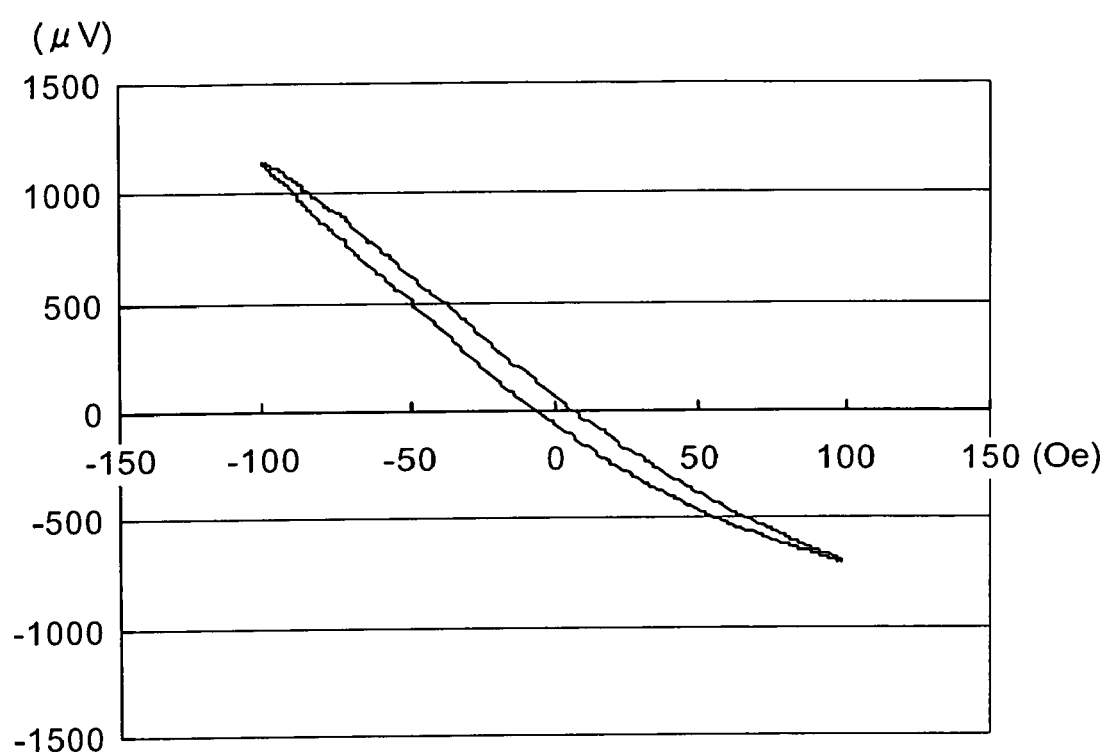
FIG. 21 is an explanatory view showing an example of detecting a defective product according to an MR loop characteristic after an AC application, representing an MR loop characteristic in QST2.

FIG. 21 shows the MR loop characteristic in QST2. In this case, the form of MR loop characteristic greatly changes from that in FIG. 20 representing the state before the DC magnetic field application, and meets the standard.

Figure 22:
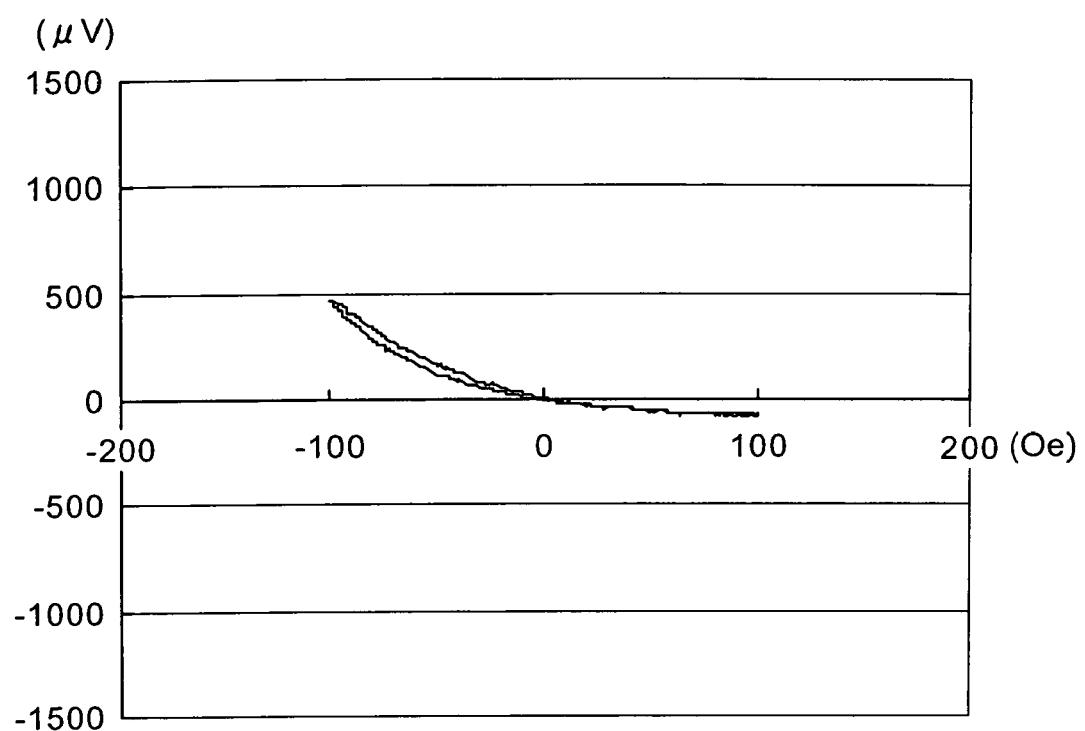
FIG. 22 is an explanatoryview showing an example of detecting a defective product according to an MR loop characteristic after an AC application, representing an MR loop characteristic in QST3.

FIG. 22 shows the MR loop characteristic in QST3. After the AC magnetic field application, the value of magnetization decreases, thereby failing to meet the standard. This is presumed to be because, while the hard bias layer is forced to have magnetization directions aligning with one direction at the stage where the DC magnetic field is applied, the individual magnetic domains are magnetized in their stabilizing directions when the AC magnetic field is applied, whereby the magnetization directions are diversified.

Figure 23:
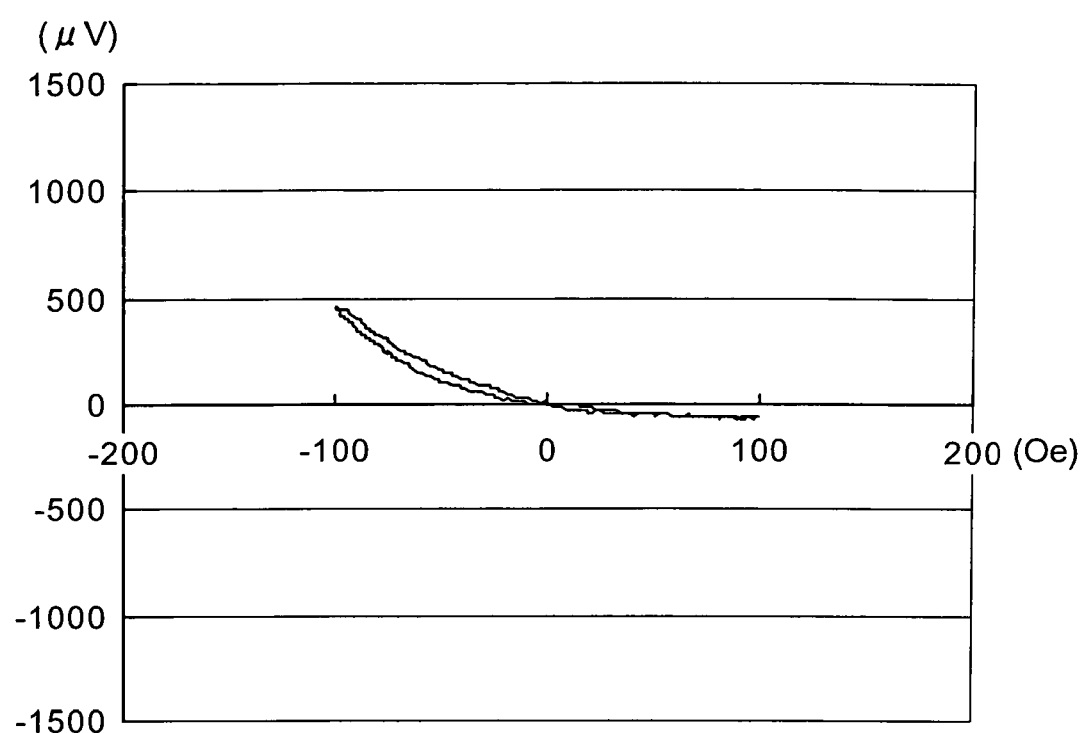
FIG. 23 is an explanatoryview showing an example of detecting a defective product according to an MR loop characteristic after an AC application, representing an MR loop characteristic in QST7.

FIG. 23 shows the MR loop characteristic in QST7. Even after a plurality of AC magnetic field applications and a thermal shock test and a high-temperature/high-humidity test in succession, the MR loop characteristic still fails to meet the standard.

Figure 24:
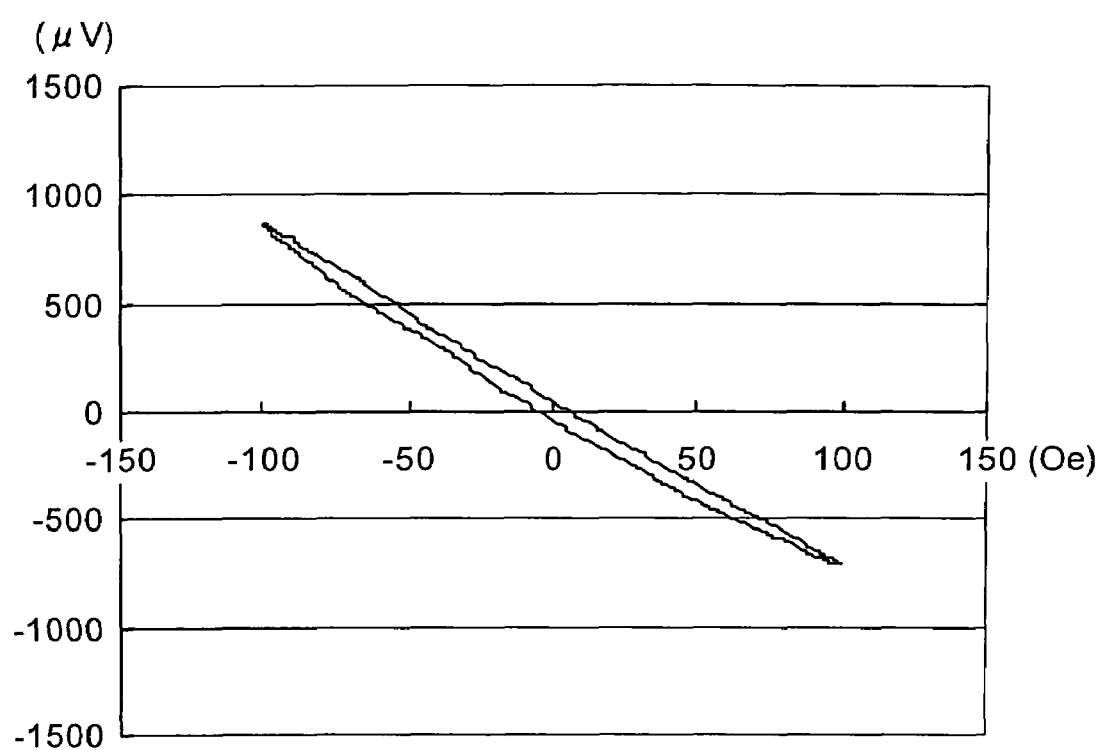
FIG. 24 is an explanatory view showing an example of detecting a defective product according to an MR loop characteristic after an AC application, representing an MR loop characteristic of the GMR film in QST1.

With reference to FIGS. 24 to 27, a second example will be explained. FIG. 24 shows the MR loop characteristic of the GMR film in QST1. The MR loop characteristic at that time met a standard.

Figure 25:
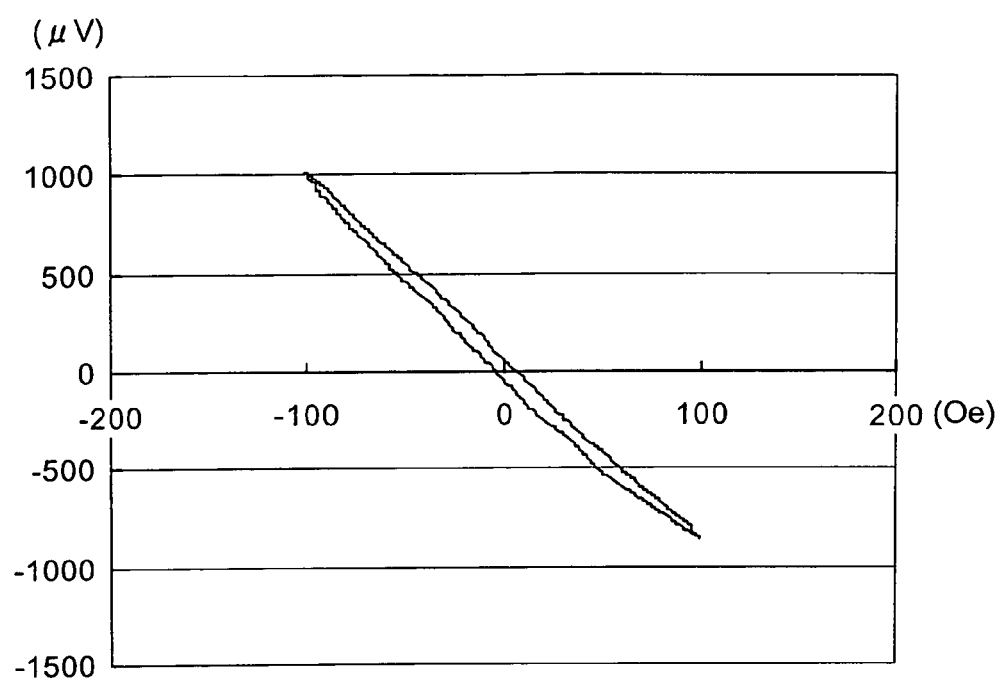
FIG. 25 is an explanatory view showing an example of detecting a defective product according to an MR loop characteristic after an AC application, representing an MR loop characteristic in QST2.

FIG. 25 shows the MR loop characteristic in QST2. The MR loop characteristic met the standard at this stage as well.

Figure 26:
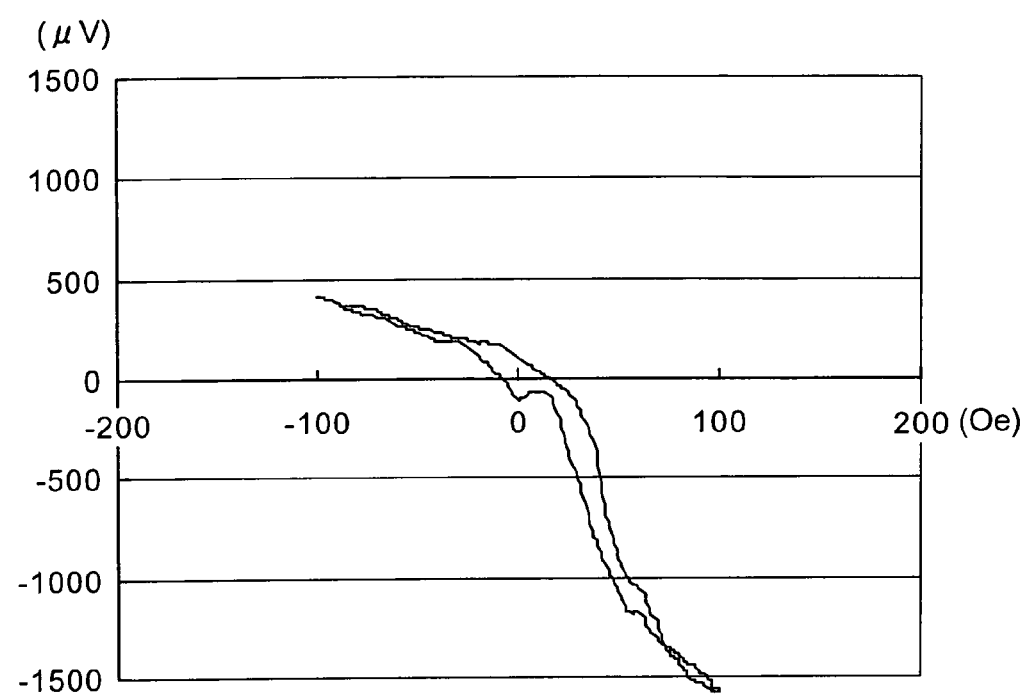
FIG 26 is an explanatory view showing an example of detecting a defective product according to an MR loop characteristic after an AC application, representing an MR loop characteristic in QST3.

FIG. 26 shows the MR loop characteristic in QST3. After the AC magnetic field was applied, the form of the MR loop characteristic collapsed, thereby yielding a value failing to meet an asymmetry standard.

Figure 27:
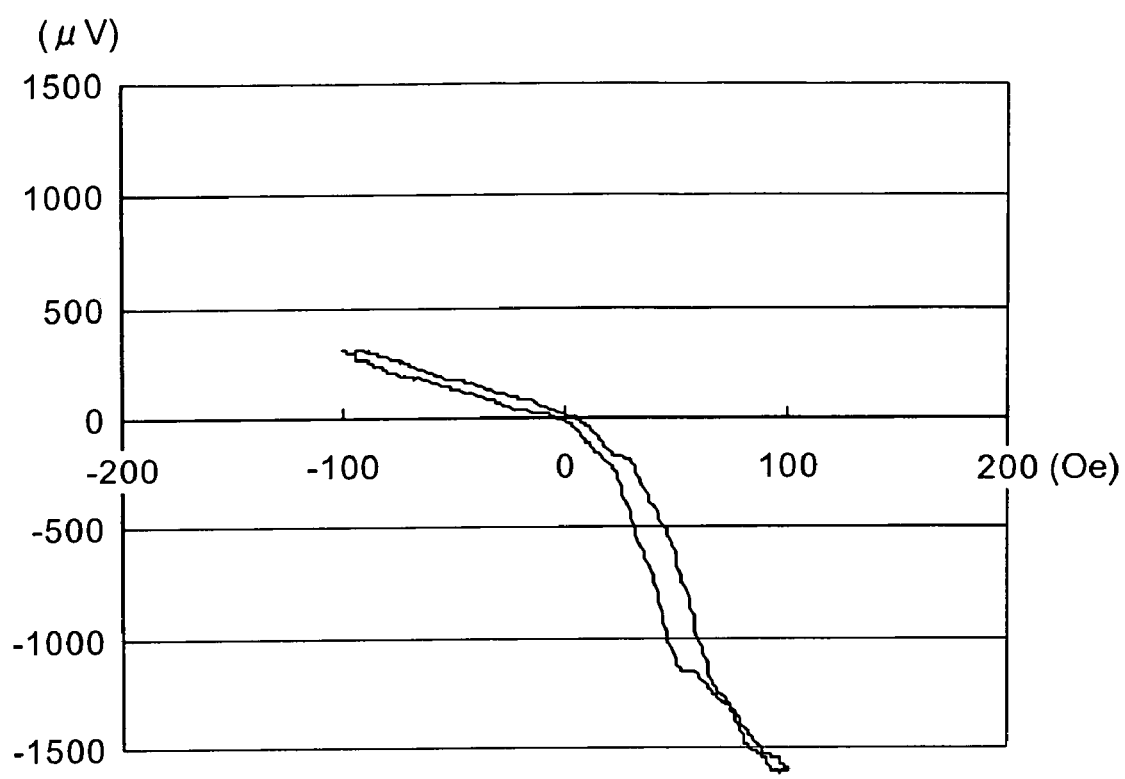
FIG. 27 is an explanatory view showing an example of detecting a defective product according to an MR loop characteristic after an AC application, representing an MR loop characteristic in QST7.

FIG. 27 shows the MR loop characteristic in QST7. Even after a plurality of AC magnetic field applications and a thermal shock test and a high-temperature/high-humidity test in succession, the MR loop characteristic still failed to meet the standard.

When the method of inspecting a thin-film magnetic head in accordance with the present invention is employed, as in the foregoing, observing the MR loop characteristic after the AC magnetic field is applied to the hard bias layer can detect a defective product which may be overlooked.

The inspecting method in accordance with the present invention is not limited to the embodiment mentioned above. For example, the magnetoresistive film of the thin-film magnetic head to be inspected is not limited to the GMR structure, but may be a TMR structure utilizing a tunneling effect, etc.

Method of Making Thin-Film Magnetic Head

The method of making a thin-film magnetic head in accordance with an embodiment will now be explained. This embodiment yields the thin-film magnetic head 10 configured as shown in FIG. 1.

A plurality of thin-film magnetic heads are produced on a single wafer. First, on the wafer, the lower electrode layer 30, buffer layer 31, antiferromagnetic layer 32, pinned layer 36, nonmagnetic conductive layer 37, free layer 40, and cap layer 45 are laminated in succession, for example, by sputtering.

Next, by utilizing a photolithography technique, a laminate from the lower electrode layer 30 to the cap layer 45 is patterned, so as to define a reproducing track width. Subsequently, an insulating layer 50 is formed, for example, by sputtering so as to cover both sides of the laminate. Further, on the insulating layer 50, hard bias layers 51, 52 and an insulating layer 55 are laminated in succession, for example, by sputtering. Thereafter, an upper electrode layer 56 is formed, whereby the structure of a reproducing head part shown in FIG. 1 is obtained. Then, if necessary, a recording head part having a thin-film coil is formed on the reproducing head part. The foregoing process conforms to a known technique, and does not limit the forming method as long as a structure having a free layer and a hard bias layer is obtained.

A subsequent manufacturing step will be explained with reference to FIG. 2. First, the wafer is diced, so as to yield bars 1 each including thin-film magnetic heads arranged in a row. While in the bar 1 state, the thin-film magnetic heads are subjected to lapping for adjusting their MR height, so as to determine an air bearing surface S opposing a recording medium such as hard disk. Here, recording electrode pads 61, 62 and reproducing electrode pads 63, 64 are connected to the thin-film magnetic head 10. The recording electrode pads 61, 62 are electrically connected to the recording head part of the thin-film magnetic head, which is not depicted, whereas the reproducing electrode pads 63, 64 are electrically connected to the lower electrode layer 30 and upper electrode layer 56 shown in FIG. 1, respectively.

Next, the bar 1 is set to a magnetic field generator (not depicted) comprising a Helmholtz coil or the like. The magnetic field generator can generate any of DC and AC magnetic fields by adjusting a current supplied to the Helmholtz coil.

Then, the magnetic field generator is initially actuated, so as to generate a DC magnetic field in the direction indicated by letter A in FIG. 2. This direction is made to coincide with the bias magnetic field applying direction in the free layer 40, whereby the hard bias layers 51, 52 (ferromagnetic layers) in the magnetoresistive film become application targets. In this embodiment, the DC magnetic field is applied in a direction along which the hard bias layers 51, 52 align with each other. The DC magnetic field is applied for about 10 seconds, for example, with a magnitude of about 8 to 10 kOe.

After the DC magnetic field application, an AC magnetic field is applied as indicated by letter B. As with the DC magnetic field, the AC magnetic field is applied in the direction along which the bias magnetic field is applied to the free layer 40, whereby the hard bias layers 51, 52 of the magnetoresistive film become application targets. The AC magnetic field is applied for about 10 milliseconds, for example, with a magnitude of about 300 to 500 Oe and a period of about 0.8 to 1.2 kHz.

By way of such a process, as explained with reference to FIGS. 3A to 3C, magnetization directions in individual magnetic domains are oriented in stable directions corresponding to respective forms of the magnetic domains and are caused to align with substantially the same direction.

After applying the DC and AC magnetic fields as in the foregoing, the bar 1 is diced, whereby a plurality of thin-film magnetic heads can be obtained.

As in the foregoing, the manufacturing method in accordance with this embodiment can stabilize the magnetization directions of the hard bias layers 51, 52 by applying the DC magnetic field and AC magnetic field in the directions mentioned above.

In general, lapping for adjusting the MR height may generate a processing distortion in the thin-film magnetic head, thereby making magnetization directions unstable. For this matter, in this embodiment, DC and AC magnetic fields are applied in the directions mentioned above after lapping as mentioned above. This can eliminate the unstableness in magnetization directions caused by lapping. When DC and AC magnetic fields are applied after lapping as such, the effect of the present invention becomes remarkable in particular.

Further, a plurality of AC magnetic field applications can further improve the stability of magnetization directions in the hard bias layers 51, 52.

Next, with reference to examples, effects of the method of making a thin-film magnetic head in accordance with the present invention will be explained specifically.

First, a plurality of thin-film magnetic heads were formed on a wafer. In each of the thin-film magnetic heads formed here, the magnetoresistive film is configured as shown in FIG. 1, but in a CIP structure in which a sense current flows in a plane direction of the film. Table 3 shows the composition of this thin-film magnetic head and thicknesses of individual layers therein. Numerals in the table correspond to those in FIG. 1. Here, electrodes were formed from Au.

TABLE 3

| NUMERAL | LAYER | MATERIAL | THICKNESS (nm) |
|---|---|---|---|
| 51, 52 | HARD BIAS LAYER | CoCrPt | — |
| 44(45) | CAP LAYER | Ta | 6.0 |
| 43(45) | CAP LAYER | CoFe | 2.0 |
| 42(45) | CAP LAYER | Ta | 2.5 |
| 41(45) | CAP LAYER | Ru | 0.5 |
| 39(40) | FREE LAYER | NiFe | 3.0 |
| 38(40) | FREE LAYER | CoFe | 1.0 |
| 37 | NONMAGNETIC CONDUCTIVE LAYER | Cu | 1.9 |
| 35(36) | PINNED LAYER | CoFe | 2.0 |
| 34(36) | PINNED LAYER | Ru | 0.8 |
| 33(36) | PINNED LAYER | CoFe | 1.5 |
| 32 | ANTIFERROMAGNETIC LAYER | PtMn | 13.0 |
| 31 | BUFFER LAYER | NiCr | 5.0 |

Then, magnetization was once effected in this wafer stage, so as to form a bias magnetic field in the free layer. The magnetic field applied here was a DC magnetic field with a magnitude of about 10 kOe. Subsequently, bars each comprising thin-film magnetic heads arranged in a row were obtained by dicing, and lapping was carried out so as to define ABS, thereby yielding a desirable MR height. Thus obtained bars were set to the X-Y-Z table in the inspection apparatus in this example, so as to be subjected to QST (Quasi Static Test). Six bars in total were subjected to the property inspection.

The inspection apparatus comprises the magnetic field generator such as Helmholtz coil, and a constant-current power supply 70 (see FIG. 2) which supplies a sense current to the magnetoresistive film of the thin-film magnetic head 10. For supplying the sense current to the magnetoresistive film, a pair of probe pins connected to the constant-current power supply 70 are brought into contact with the reproducing electrode pads 63, 64, respectively.

In the QST, the asymmetric property of output amplitude with respect to changes in the external magnetic field so-called asymmetry) and reproducing output were inspected. As shown in Table 4, QST was carried out every time when a DC or AC magnetic field is applied, etc. In each QST, while the constant-current power supply 70 supplies a sense current of about 2 to 4 mA to the thin-film magnetic head, the magnetic field generator applies an external magnetic field with a magnitude of 50 to 200 Oe and a frequency of about 80 Hz to the thin-film magnetic head in the track width direction thereof. Asymmetry A is as represented by the above mentioned expression (1).

TABLE 4

| STEP | QST(TIMES) | EXTERNAL ACTION |
|---|---|---|
| 1 | QST1 | — |
| 2 | — | DC MAGNETIC FIELD APPLICATION |
| 3 | QST2 | — |
| 4 | — | AC MAGNETIC FIELD APPLICATION |
| 5 | QST3 | — |
| 6 | — | AC MAGNETIC FIELD APPLICATION |
| 7 | QST4 | — |

TABLE 4-continued

| STEP | QST(TIMES) | EXTERNAL ACTION |
|---|---|---|
| 8 | — | AC MAGNETIC FIELD APPLICATION |
| 9 | QST5 | — |
| 10 | — | AC MAGNETIC FIELD APPLICATION (7 TIMES) |
| 11 | QST6 | — |
| 12 | — | THERMAL SHOCK TEST & HIGH-TEMPERATURE/ HIGH-HUMIDITY TEST |
| 13 | QST7 | — |

Initially, the first QST (QST1) shown at step 1 was carried out before the magnetic field application in the bar state. The QST1 was a test as a comparative example. Subsequently, at step 2, the magnetic field generator was actuated, so as to apply a DC magnetic field to the bar. The direction of the DC magnetic field was caused to coincide with the bias magnetic field applying direction in the free layer. The DC magnetic field was applied for 10 seconds with a magnitude of 8 kOe. After applying the DC magnetic field, QST2 was carried out at step 3. The QST2 was also a test as a comparative example.

At step 4, an AC magnetic field was applied to the bar in a direction equal to the DC magnetic field applying direction. The AC magnetic field was applied for 10 milliseconds at a frequency of 1 kHz with a maximum value of 400 Oe. This completed the method of making a thin-film magnetic head in accordance with this embodiment. After applying the AC magnetic field, QST3 was carried out at step 5. Each QST after the QST3 was a test as an example.

Further, at step 6, the AC magnetic field was applied to the bar under the same condition as with step 4. Thereafter, at step 7, QST4 was carried out. Subsequently, at step 8, the AC magnetic field was applied to the bar under the same condition as with step 4. Then, at step 9, QST5 was carried out.

At step 10, the AC magnetic field was applied seven times under the condition of step 4. Thus, the AC magnetic field was applied 10 times in the bar state. Thereafter, at step 11, QST6 was carried out.

At step 12, a thermal shock test and a high-temperature/high-humidity test were carried out in this order. In the thermal shock test, a temperature change was continuously provided for 24 hours at a rate of 1 cycle/hr within the temperature range of −40° C. to 70° C. In the high-temperature/high-humidity test, the bar was left for 24, hours in an environment at a temperature of 60° C. with a humidity of 85%. Thereafter, at step 13, QST7 was carried out.

EXAMPLE 5

First, with reference to FIGS. 28 to 33, results of asymmetry property in each of the above-mentioned QSTs will be explained. The following results refer to those of thin-film magnetic heads formed in one of a plurality of bars.

Figure 28:
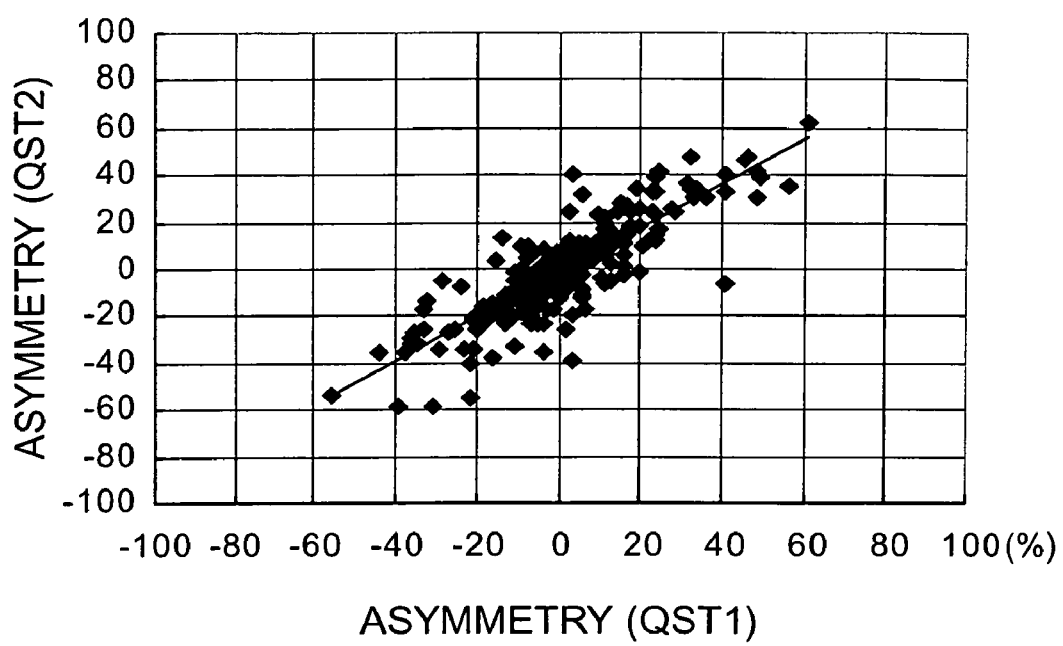
FIG. 28 is a graph showing changes in asymmetry between before and after a DC magnetic field application.

FIG. 28 is a graph whose abscissa and ordinate indicate measurement results of QST1 and QST2, respectively. Namely, this graph shows changes in asymmetry between before and after a DC magnetic field application. Though it will be ideal if values of asymmetry do not change between before and after an external magnetic field or the like is applied (i.e., it will be preferred if plotted points concentrate at the line in the graph), the values of asymmetry fluctuate greatly between before and after the DC magnetic field application as can be seen from this graph. Hence, the amount of change in asymmetry was large.

Figure 29:
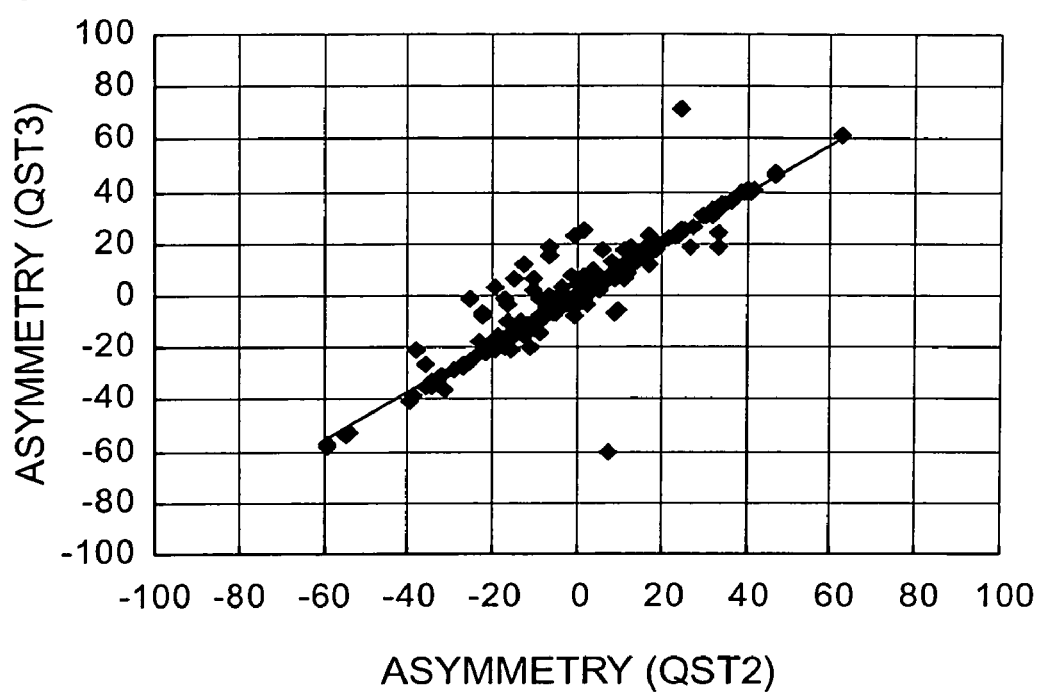
FIG. 29 is a graph showing changes in asymmetry between before and after an AC magnetic field application.

FIG. 29 is a graph whose abscissa and ordinate indicate measurement results of QST2 and QST3, respectively. Namely, the graph shows changes in asymmetry between before and after an AC magnetic field application. Fluctuations in values of asymmetry were seen here and there in this case as well. From this result, it has been found that, if a DC magnetic field is applied alone, values of asymmetry vary when an external magnetic field (the AC magnetic field at step 4 here) is applied thereafter.

Figure 30:
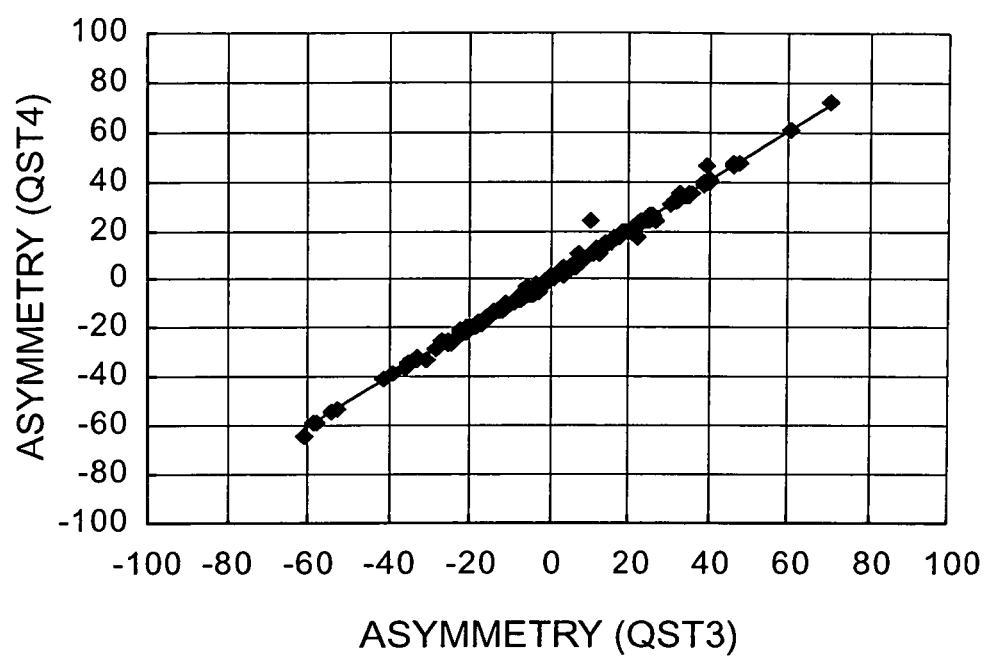
FIG. 30 is a graph showing changes in asymmetry between after the first AC magnetic field application and after the second AC magnetic field application.

FIG. 30 is a graph whose abscissa and ordinate indicate measurement results of QST3 and QST4, respectively. In this case, changes in asymmetry are seen to be suppressed slightly between before and after the second AC magnetic field application (between before and after step 6). Namely, it has been verified that, after the AC magnetic field is applied in the same direction as with the DC magnetic field at step 4, asymmetry hardly changes even when an external magnetic field (corresponding to the AC magnetic field at step 6) is applied thereafter. This seems to be because the magnetization direction of the hard bias layer is stabilized by applying the DC magnetic field at step 2 and the AC magnetic field at step 4.

Figure 31:
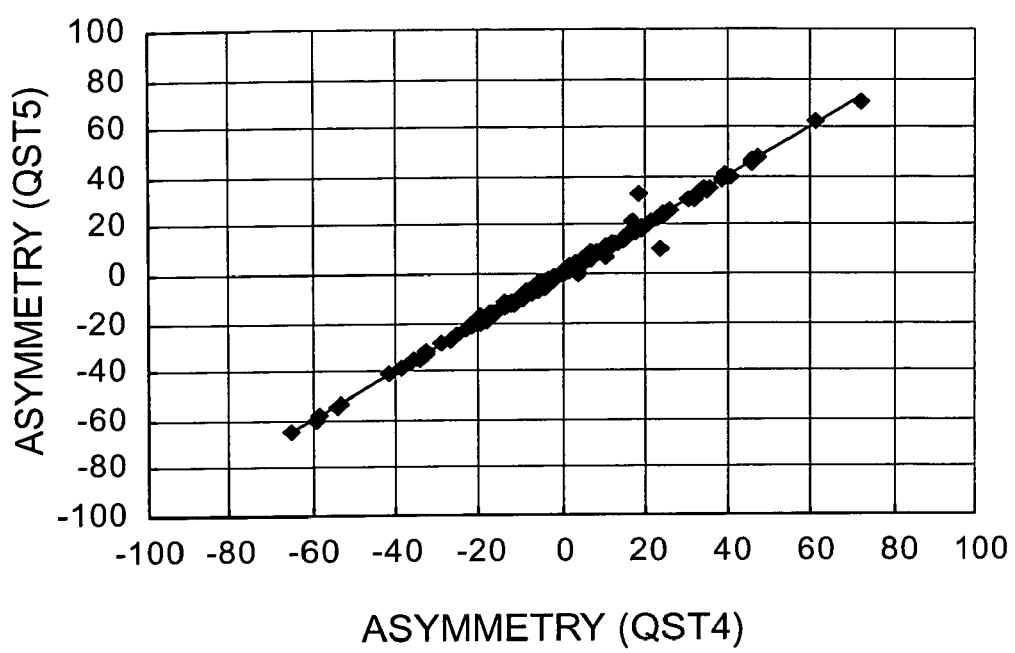
FIG. 31 is a graph showing changes in asymmetry between after the second AC magnetic field application and after the third AC magnetic field application.

FIG. 31 is a graph whose abscissa and ordinate indicate measurement results of QST4 and QST5, respectively. This graph shows that asymmetry is stable even after an AC magnetic field is further applied at step 8.

Figure 32:
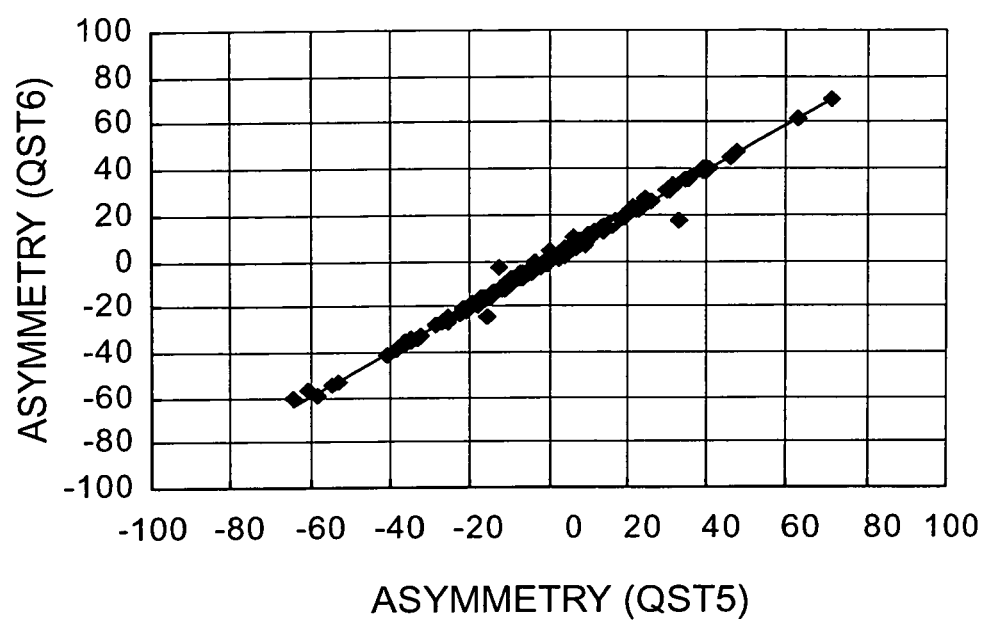
FIG. 32 is a graph showing changes in asymmetry between after the third AC magnetic field application and after the tenth AC magnetic field application.

FIG. 32 is a graph whose abscissa and ordinate indicate measurement results of QST5 and QST6, respectively. Namely, this graph represents changes in asymmetry between before and after seven AC magnetic field applications in addition. This graph shows that asymmetry hardly changes between before and after the seven AC magnetic field applications.

Figure 33:
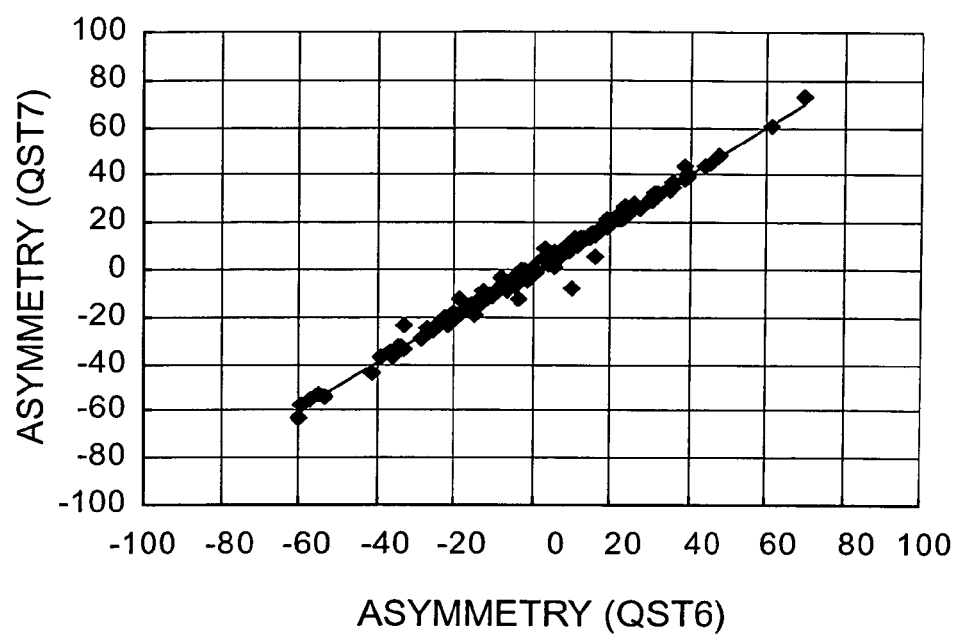
FIG. 33 is a graph showing changes in asymmetry between after the tenth AC magnetic field application and after a thermal shock test and a high-temperature/high-humidity test.

FIG. 33 is a graph whose abscissa and ordinate indicate measurement results of QST6 and QST7, respectively. Namely, the graph represents changes in asymmetry between before and after a thermal shock test and a high-temperature/high-humidity test. This graph shows that asymmetry hardly changes. This has verified that the thin-film magnetic head in which the DC and AC magnetic fields are applied in the directions mentioned above as in this embodiment are excellent in resistances to thermal shock and high temperature/high humidity.

EXAMPLE 6

With reference to FIGS. 34 to 39, results of reproducing output in each of the above-mentioned QSTs will now be explained.

Figure 34:
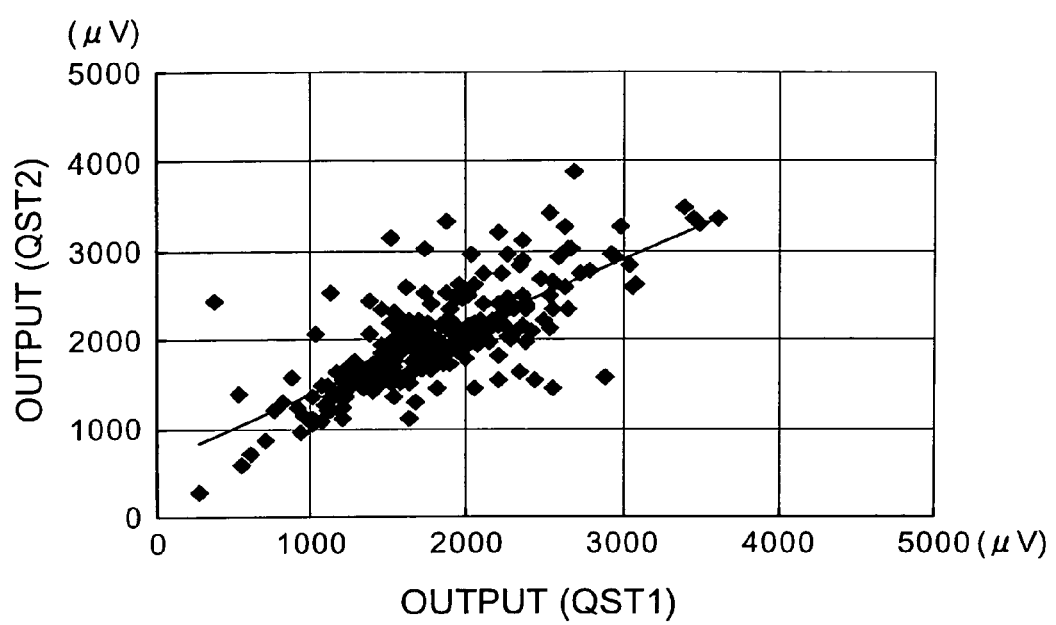
FIG. 34 is a graph showing changes in reproducing output between before and after a DC magnetic field application.

FIG. 34 is a graph whose abscissa and ordinate indicate measurement results of QST1 and QST2, respectively. Namely, this graph shows changes in reproducing output between before and after the DC magnetic field application at step 2. Though it will be ideal if values of reproducing output do not change between before and after an external magnetic field or the like is applied, the values of reproducing output fluctuate greatly between before and after the DC magnetic field application as can be seen from this graph.

Figure 35:
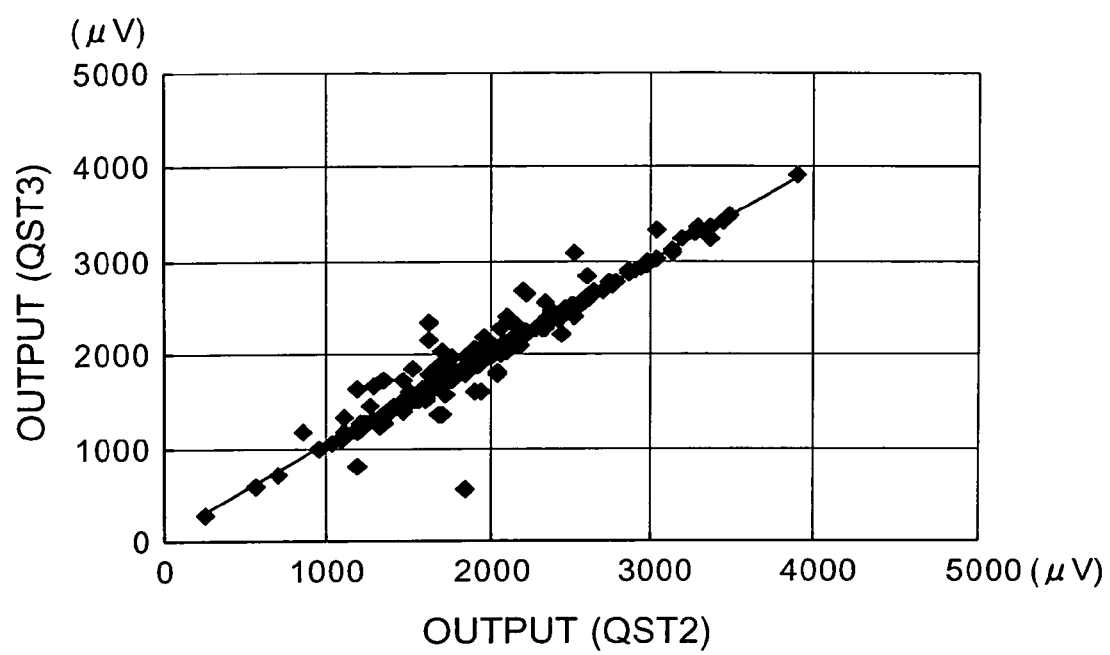
FIG. 35 is a graph showing changes in reproducing output between before and after an AC magnetic field application.

FIG. 35 is a graph whose abscissa and ordinate indicate measurement results of QST2 and QST3, respectively. Namely, the graph shows changes in reproducing output between before and after an AC magnetic field application. Fluctuations in values of reproducing output were seen here and there in this case as well. From this result, it has been found that, if a DC magnetic field is applied alone, values of reproducing output vary when an external magnetic field (the AC magnetic field at step 4 here) is applied thereafter.

Figure 36:
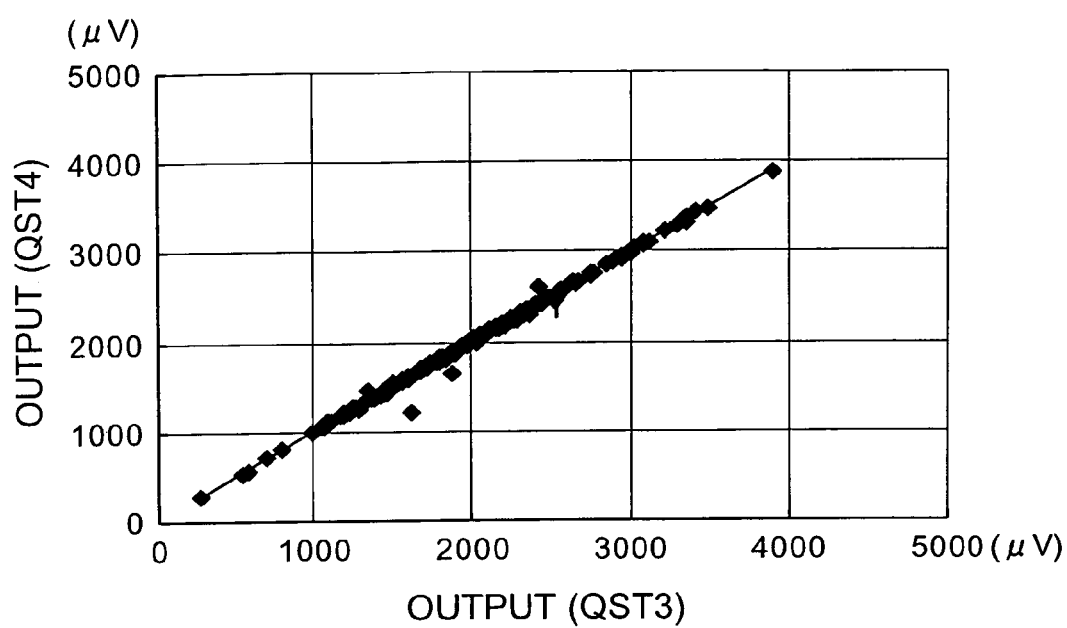
FIG. 36 is a graph showing changes in reproducing output between after the first AC magnetic field application and after the second AC magnetic field application.

FIG. 36 is a graph whose abscissa and ordinate indicate measurement results of QST3 and QST4, respectively. In this case, changes in reproducing output are seen to be suppressed slightly between before and after the second AC magnetic field application (between before and after step 6). Namely, it has been verified that, after the AC magnetic field is applied in the same direction as with the DC magnetic field at step 4, reproducing output hardly changes even when an external magnetic field (corresponding to the AC magnetic field at step 6) is applied thereafter. This seems to be because the magnetization direction of the hard bias layer is stabilized by applying the DC magnetic field at step 2 and the AC magnetic field at step 4.

Figure 37:
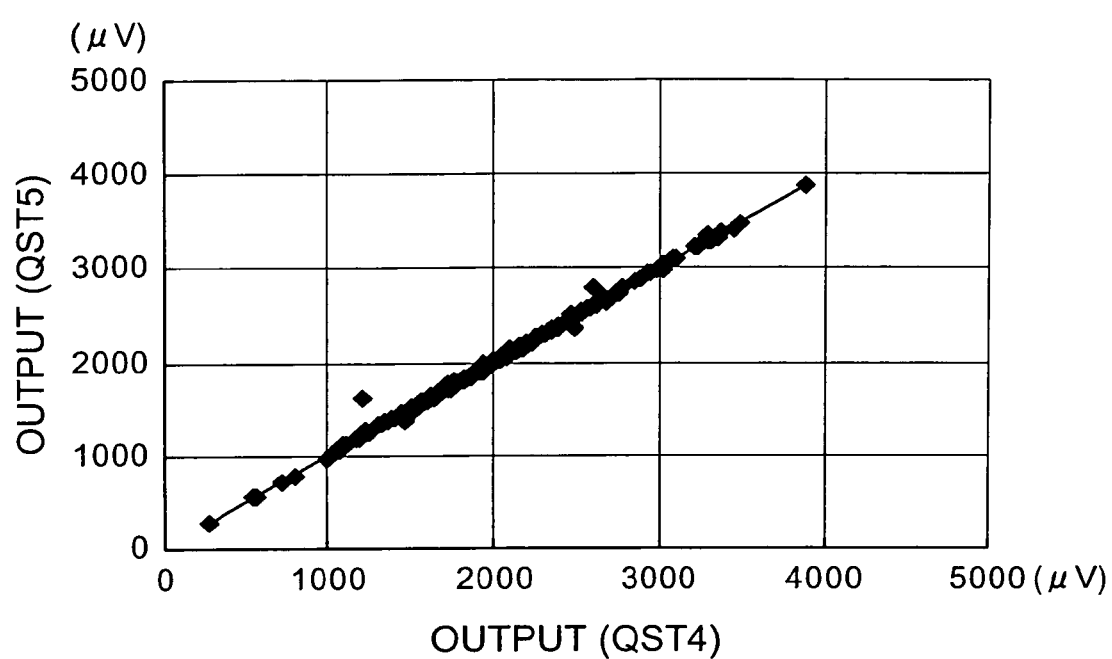
FIG. 37 is a graph showing changes in reproducing output between after the secondAC magnetic field application and after the third AC magnetic field application.

FIG. 37 is a graph whose abscissa and ordinate indicate measurement results of QST4 and QST5, respectively. This graph shows that reproducing output is stable even after an AC magnetic field is further applied at step 8.

Figure 38:
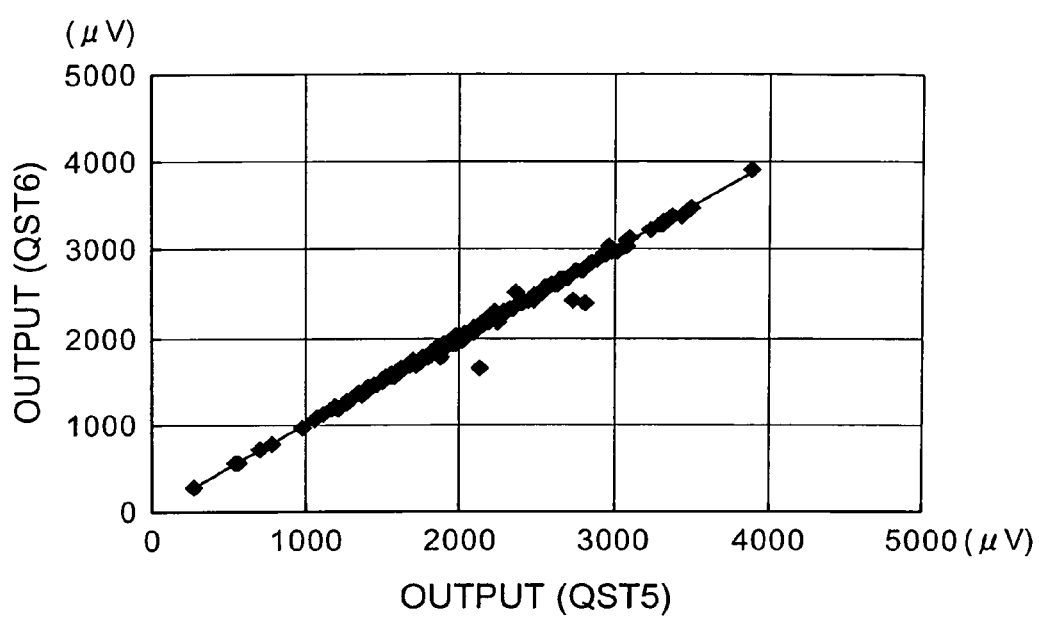
FIG. 38 is a graph showing changes in reproducing output between after the third AC magnetic field application and after the tenth AC magnetic field application.

FIG. 38 is a graph whose abscissa and ordinate indicate measurement results of QST5 and QST6, respectively. Namely, this graph represents changes in reproducing output between before and after seven AC magnetic field applications in addition. This graph shows that reproducing output hardly changes between before and after the seven AC magnetic field applications.

Figure 39:
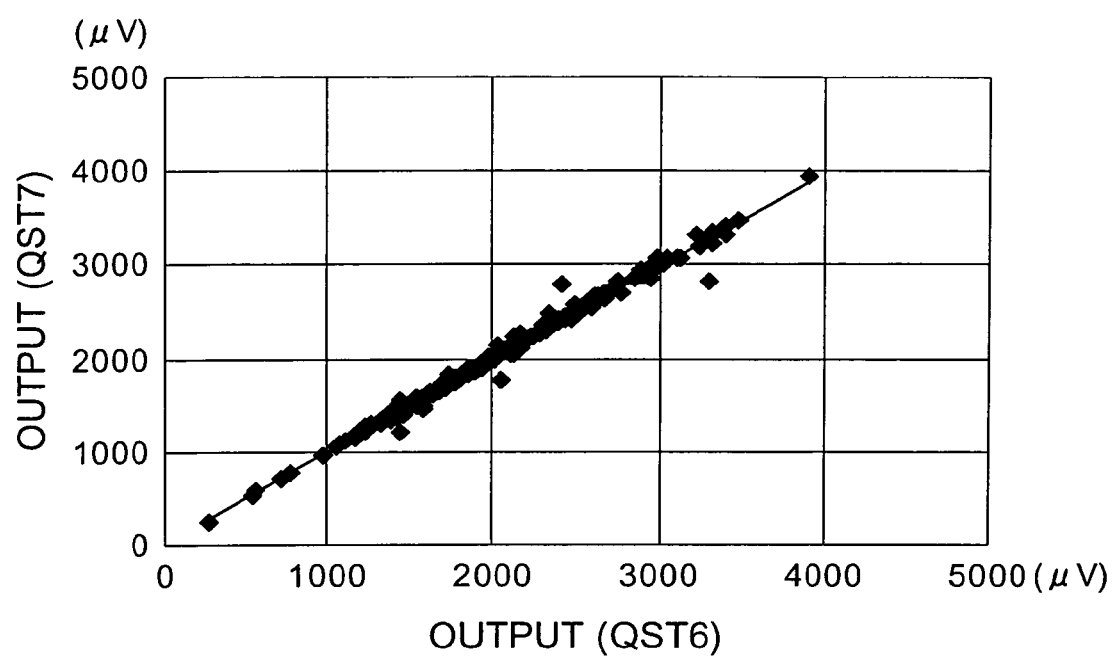
FIG. 39 is a graph showing changes in asymmetry between after the tenth AC magnetic field application and after a thermal shock test and a high-temperature/high-humidity test.

FIG. 39 is a graph whose abscissa and ordinate indicate measurement results of QST6 and QST7, respectively. Namely, the graph represents changes in reproducing output between before and after a thermal shock test and a high-temperature/high-humidity test. This graph shows that reproducing output hardly changes between before and after these tests.

EXAMPLE 7

With reference to FIGS. 40 to 43, MR loop characteristics of GMR films measured in the individual QSTs will now be explained.

Figure 40:
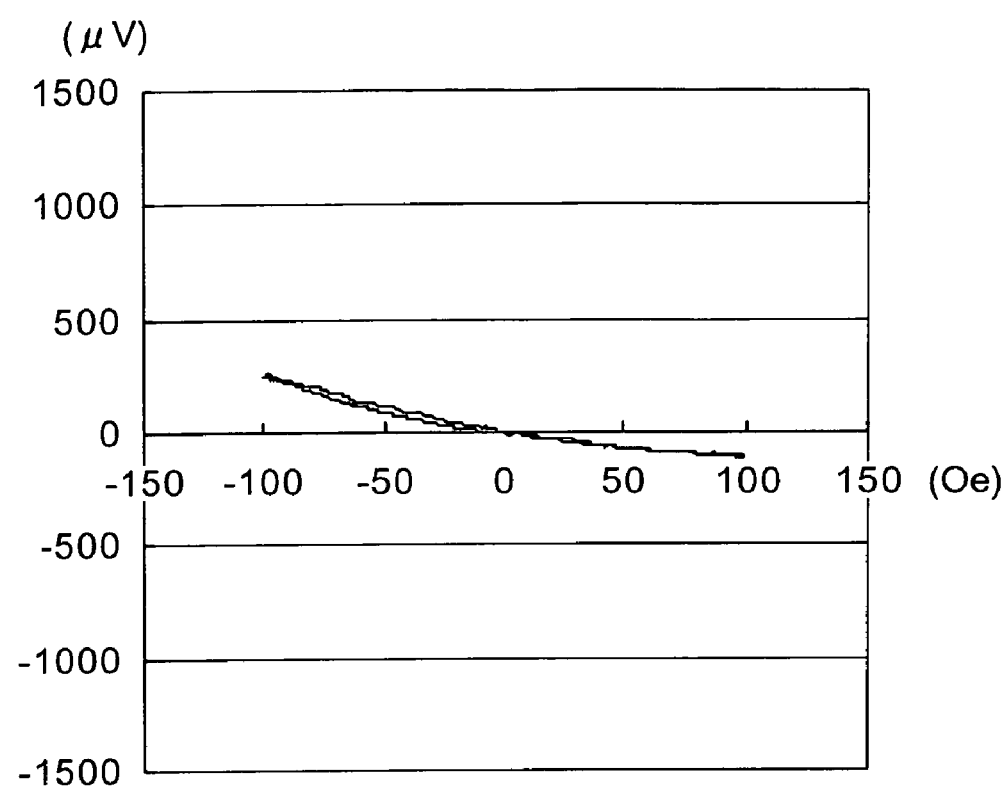
FIG. 40 is a chart showing an MR loop characteristic of a GMR film in QST1.

FIG. 40 shows the MR loop characteristic in the GMR film in QST1. The MR loop characteristic indicates a head output voltage with respect to an external magnetic field. The abscissa and ordinate indicate external magnetic field (Oe) and reproducing output voltage (µV), respectively. As can be seen from this graph, before applying the external magnetic field, the reproducing output voltage value is so low that it fails to reach a predetermined standard.

Figure 41:
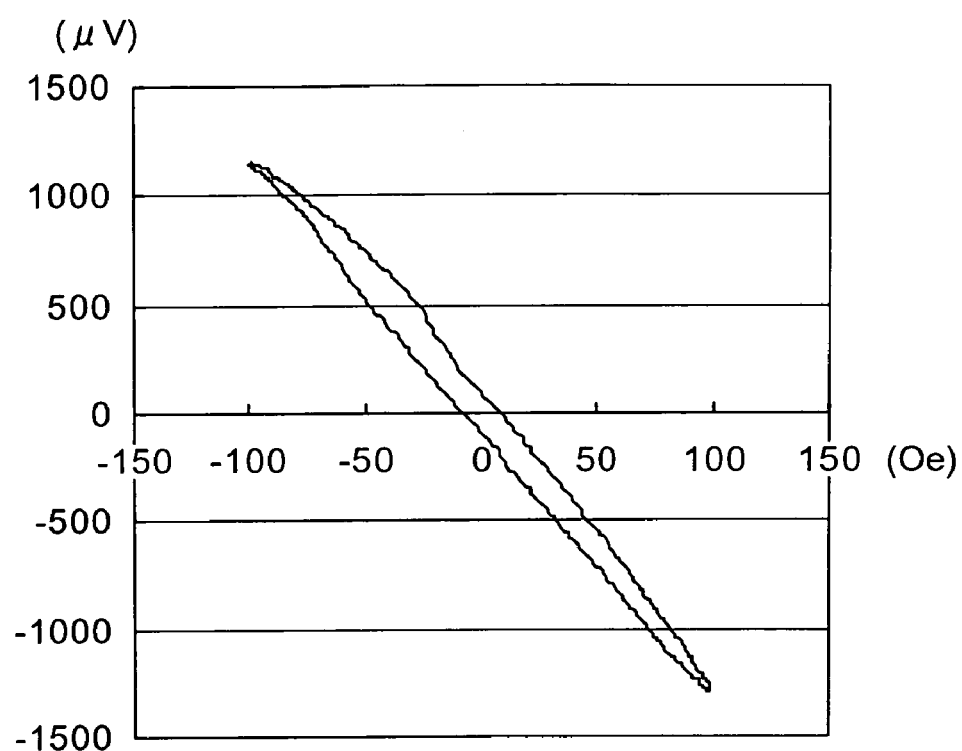
FIG. 41 is a chart showing an MR loop characteristic of a GMR film in QST2.

FIG. 41 shows the MR loop characteristic in QST2. The form of MR loop characteristic in this case greatly changes from that in FIG. 40 representing the state before the DC magnetic field application, so as to meet the standard.

Figure 42:
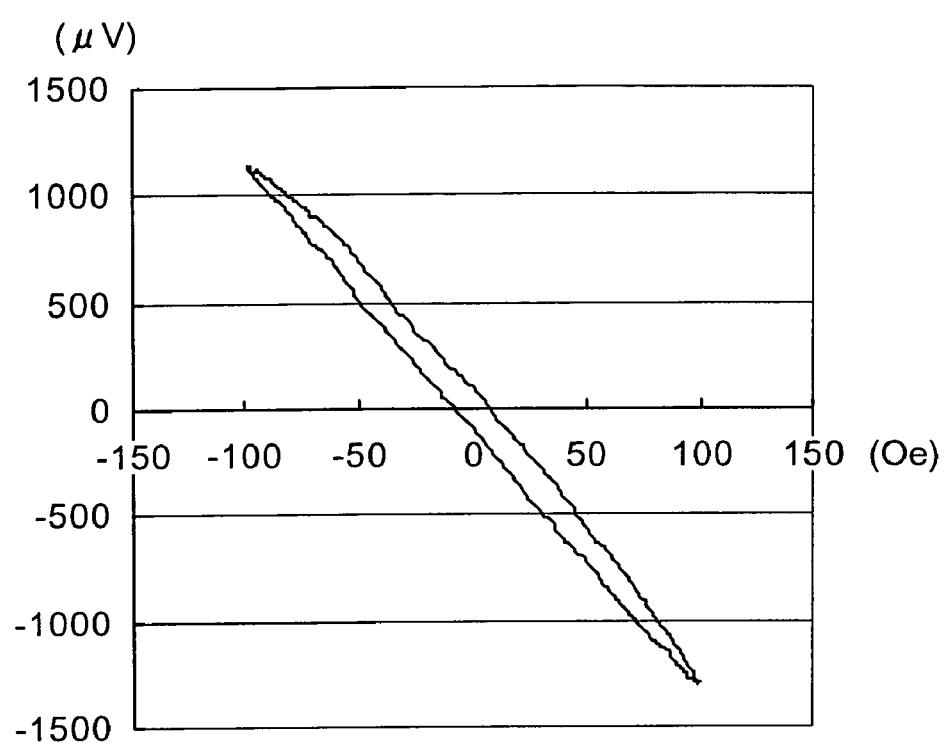
FIG. 42 is a chart showing an MR loop characteristic of a GMR film in QST3.

FIG. 42 represents the MR loop characteristic in QST3. This result shows that the MR loop characteristic after the DC magnetic field application is substantially maintained after the AC magnetic field is applied.

Figure 43:
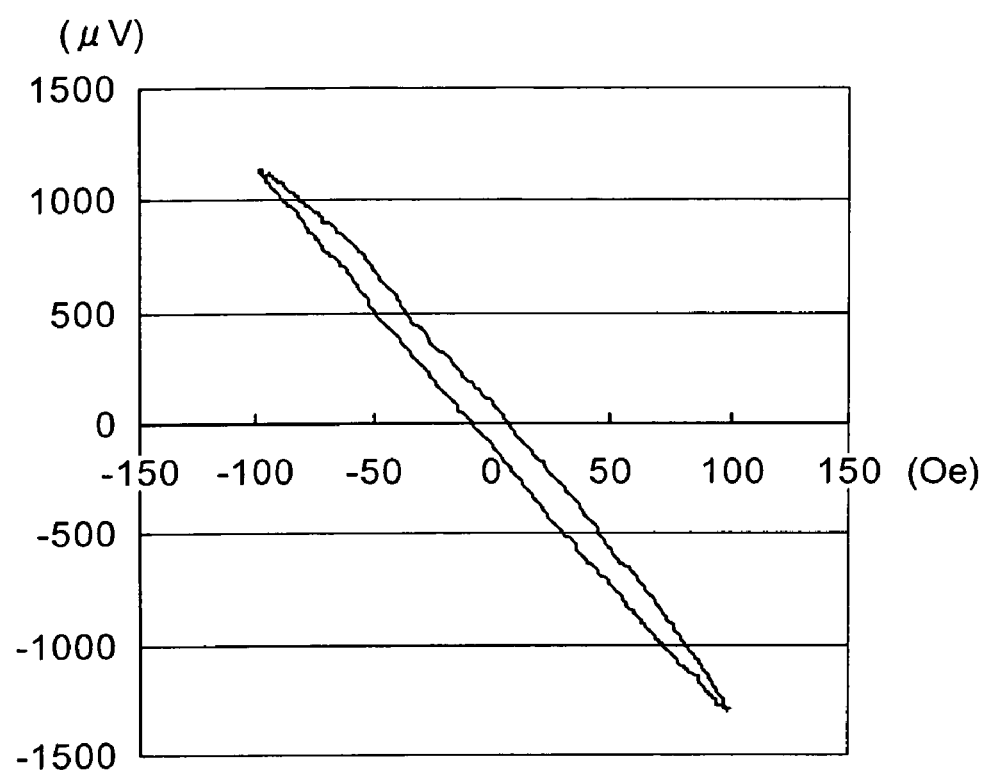
FIG. 43 is a chart showing an MR loop characteristic of a GMR film in QST7.

FIG. 43 represents the MR loop characteristic in QST7. This result shows that the MR loop characteristic is substantially maintained even after carrying out the thermal shock test and high-temperature/high-humidity test.

Though the thin-film magnetic heads exhibiting the foregoing MR loop characteristics failed to meet the standard in their initial states before the DC magnetic field application, they can finally be treated as favorable products meeting the standard. Namely, the inspecting method of the present invention can also prevent thin-film magnetic heads which can inherently be treated as favorable products from being handled as defective products.

Though the method of making a thin-film magnetic head is specifically explained with reference to the embodiments in the foregoing, the present invention is not limited to the above-mentioned embodiments. For example, the DC and AC magnetic fields may be applied before the lapping for adjusting the MR height instead of thereafter. Also, these magnetic fields may be applied at the wafer stage instead of the bar state, or in a state where the individual thin-film magnetic heads are cut from the bar.

The hard bias layer may be magnetized before applying the DC and AC magnetic fields, or initially magnetized by the DC and AC magnetic fields. The magnetoresistive film of the thin-film magnetic head to be inspected is not limited to the GMR structure, but may be a TMR structure utilizing a tunneling effect, etc.

As explained in the foregoing, the method of inspecting a thin-film magnetic head in accordance with the present invention can inspect properties while in a state where the magnetization direction of the hard bias layer is made stable. Also, the method of making a thin-film magnetic head in accordance with the present invention can stabilize the magnetization direction of the hard bias layer.

What is claimed is:

1. A method of inspecting a thin-film magnetic head comprising the steps of:
    preparing a thin-film magnetic head comprising a magnetoresistive film having a free layer whose magnetization direction changes depending on an external magnetic field and a ferromagnetic layer for applying a bias magnetic field to the free layer;
    applying a DC magnetic field to the ferromagnetic layer in a direction along which the bias magnetic field is applied;
    thereafter applying an AC magnetic field to the ferromagnetic layer in a direction along which the bias magnetic field is applied; and
    inspecting a property of the thin-film magnetic head by applying an external magnetic field to the magnetoresistive film while supplying a current thereto.

2. A method of inspecting a thin-film magnetic head according to claim 1, wherein the DC magnetic field and AC magnetic field are applied after lapping for adjusting an MR height is carried out.

3. A method of inspecting a thin-film magnetic head according to claim 1, wherein the property of the thin-film magnetic head is an asymmetric property of output amplitude with respect to a change in the external magnetic field.

4. A method of inspecting a thin-film magnetic head according to claim 1, wherein the property of the thin-film magnetic head is a reproducing output of the thin-film magnetic head.

5. A method of inspecting a thin film magnetic head according to claim 1, further comprising the step of determining whether the thin-film magnetic head is favorable or not according to a property value obtained by the inspection and a reference value.

6. A method of inspecting a thin-film magnetic head according to claim 1, further comprising the steps of:
    obtaining a reference property value by the inspection of the thin-film magnetic head in a state where neither DC magnetic field nor AC magnetic field is applied; and
    determining whether the thin-film magnetic head is favorable or not, according to an amount of change of a property value obtained by the inspection of the thin-film magnetic head in a state where the DC magnetic field and AC magnetic field are applied thereto, with respect to the reference property value.

7. A method of making a thin-film magnetic head comprising the steps of:
    forming a thin-film magnetic head comprising a magnetoresistive film having a free layer whose magnetization direction changes depending on an external magnetic field and a ferromagnetic layer for applying a bias magnetic field to the free layer;
    applying a DC magnetic field to the ferromagnetic layer in a direction along which the bias magnetic field is applied; and
    thereafter applying an AC magnetic field to the ferromagnetic layer in a direction along which the bias magnetic field is applied.

8. A method of making a thin-film magnetic head according to claim 7, wherein the DC magnetic field and AC magnetic field are applied after lapping for adjusting an MR height is carried out.

9. A method of making a thin-film magnetic head according to claim 7, wherein the AC magnetic field is applied a plurality of times.

* * * * *